United States Patent
Sundararajan et al.

(10) Patent No.: US 9,374,780 B2
(45) Date of Patent: Jun. 21, 2016

(54) POWER MANAGEMENT FOR RAN-WLAN INTEGRATION

(71) Applicant: QUALCOMM Incorporated, San Diego, CA (US)

(72) Inventors: Jay Kumar Sundararajan, San Diego, CA (US); Manu Sharma, San Diego, CA (US); Arnaud Meylan, San Diego, CA (US); Gavin Bernard Horn, La Jolla, CA (US); Rajat Prakash, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 113 days.

(21) Appl. No.: 14/330,780

(22) Filed: Jul. 14, 2014

(65) Prior Publication Data
US 2015/0016323 A1    Jan. 15, 2015

Related U.S. Application Data

(60) Provisional application No. 61/846,540, filed on Jul. 15, 2013.

(51) Int. Cl.
*H04W 52/02* (2009.01)
*H04W 76/04* (2009.01)
*H04W 36/14* (2009.01)
*H04W 88/06* (2009.01)

(52) U.S. Cl.
CPC ...... *H04W 52/0209* (2013.01); *H04W 52/0212* (2013.01); *H04W 76/048* (2013.01); *H04W 36/14* (2013.01); *H04W 88/06* (2013.01)

(58) Field of Classification Search
None
See application file for complete search history.

(56) References Cited

U.S. PATENT DOCUMENTS

| 8,169,957 | B2* | 5/2012 | Damnjanovic .... H04W 52/0216 370/318 |
|---|---|---|---|
| 2005/0186906 | A1 | 8/2005 | Hussmann |
| 2009/0213800 | A1* | 8/2009 | Lee ......................... H04L 12/12 370/329 |
| 2011/0188425 | A1 | 8/2011 | Rydnell et al. |
| 2011/0305177 | A1 | 12/2011 | Woo et al. |
| 2012/0120815 | A1* | 5/2012 | Anderson ........... H04W 76/048 370/252 |
| 2013/0017829 | A1 | 1/2013 | Kim et al. |
| 2013/0039287 | A1 | 2/2013 | Rayavarapu et al. |
| 2013/0107863 | A1 | 5/2013 | Faccin et al. |
| 2013/0128778 | A1 | 5/2013 | Bennett |
| 2013/0210481 | A1 | 8/2013 | Sane |
| 2013/0294314 | A1 | 11/2013 | Lee et al. |

OTHER PUBLICATIONS

International Search Report and Written Opinion—PCT/US2014/046620—ISA/EPO—Oct. 21, 2014.

* cited by examiner

*Primary Examiner* — Brian Roberts
(74) *Attorney, Agent, or Firm* — Patterson & Sheridan, LLP

(57) ABSTRACT

Certain aspects of the present disclosure provide methods and apparatus for modified power management for UEs in a wireless communication system that utilizes one or more RANs for communication. For example, certain aspects of the present disclosure relate to a technique for controlling when the UE is placed in a low power state in the first RAN based, at least in part, on inactivity of the UE in the first RAN. Certain aspects of the present disclosure also relate to controlling when to modify one or more network bearers between the first RAN or the second RAN and the core network based, at least in part, on at least one of inactivity on the one or more network bearers or inactivity in both the first RAN and the second RAN. According to certain aspects, the first RAN may include a WWAN and the second RAN may include a WLAN.

30 Claims, 15 Drawing Sheets

POWER MANAGEMENT FOR RAN-WLAN INTEGRATION

CROSS-REFERENCE TO RELATED APPLICATION(S)

This application claims benefit of U.S. Provisional Patent Application Ser. No. 61/846,540, filed Jul. 15, 2013, which is herein incorporated by reference in its entirety.

BACKGROUND

I. Field of the Disclosure

Certain aspects of the present disclosure generally relate to techniques and apparatus for power management for wireless communication systems and, more particularly, to power management for integrated radio access network (RAN) and wireless local area network (WLAN) systems that use Wi-Fi as an additional carrier for wireless communication.

II. Description of Related Art

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

Some systems may utilize a relay base station that relays messages between a donor base station and wireless terminals. The relay base station may communicate with the donor base station via a backhaul link and with the terminals via an access link. In other words, the relay base station may receive downlink messages from the donor base station over the backhaul link and relay these messages to the terminals over the access link. Similarly, the relay base station may receive uplink messages from the terminals over the access link and relay these messages to the donor base station over the backhaul link.

Some wireless multiple-access communication systems may utilize co-located Wi-Fi access points (APs) and cellular-based base stations (BSs) (e.g., a Wi-Fi AP and base station in close proximity to one another) to provide connectivity through Wi-Fi and cellular radio links. When a terminal connected to the co-located Wi-Fi AP and BS utilizes an additional Wi-Fi carrier (e.g., in addition to the cellular link) for communication with the core network, it may be helpful to determine, for the terminal, entry into one or more power management modes.

SUMMARY

Certain aspects of the present disclosure generally relate to techniques and apparatus for power management for integrated radio access network (RAN) and wireless local area network (WLAN) systems that use Wi-Fi as an additional carrier for wireless communication.

Certain aspects of the present disclosure provide a method for wireless communications with a user equipment (UE) capable of communicating with the core network via at least a RAN and a second RAN. The method generally includes controlling when the UE is placed in a low power state in the first RAN based, at least in part, on inactivity of the UE in the first RAN and controlling when to modify one or more network bearers between the first RAN or the second RAN and the core network based, at least in part, on at least one of inactivity on the one or more network bearers or inactivity in both the first RAN and the second RAN.

Certain aspects of the present disclosure provide a method for wireless communications by a UE capable of communicating with a core network via at least a first RAN and a second RAN. The method generally includes establishing a connection to the core network via the second RAN and disabling reselection in the first RAN until the connection to the core network via the second RAN is deactivated.

Certain aspects of the present disclosure provide a method for wireless communications by a UE capable of communicating with a core network via at least a first RAN and a second RAN. The method generally includes performing reselection in the first RAN from a first cell to a second cell and deactivating a connection to the core network via the second RAN, in response to performing the reselection.

Certain aspects of the present disclosure provide a method for wireless communications by a UE capable of communicating with a core network via at least a first RAN and a second RAN. The method generally includes establishing a connection to the core network via the second RAN and determining whether or not to send a request to the core network for entry into a low power state in the first RAN based at least on activity in the second RAN.

Certain aspects of the present disclosure provide a method for wireless communications by a UE capable of communicating with a core network via at least a first RAN and a second RAN. The method generally includes entering idle mode in the first RAN, based on a request to enter the idle mode, and determining whether or not to maintain a connection in the second RAN based, at least in part, on whether or not the UE receives an indication a network bearer is maintained after entering idle mode.

Certain aspects of the present disclosure provide an apparatus for wireless communications with a UE capable of communicating with a core network via at least a first RAN and a second RAN. The apparatus generally includes means for controlling when the UE is placed in a low power state in the first RAN based, at least in part, on inactivity of the UE in the first RAN and means for controlling when to modify one or more network bearers between the first RAN or the second RAN and the core network based, at least in part, on at least one of inactivity on the one or more network bearers or inactivity in both the first RAN and the second RAN.

Certain aspects of the present disclosure provide an apparatus for wireless communications with a UE capable of communicating with a core network via at least a first RAN and a second RAN. The apparatus generally includes at least one processor configured to: control when the UE is placed in a low power state in the first RAN based, at least in part, on inactivity of the UE in the first RAN and control when to modify one or more network bearers between the first RAN or the second RAN and the core network based, at least in part, on at least one of inactivity on the one or more network bearers or inactivity in both the first RAN and the second RAN. The apparatus generally also includes a memory coupled with the at least one processor.

Certain aspects of the present disclosure provide a computer readable medium for wireless communications with a UE capable of communicating with a core network via at least a RAN and a second RAN. The computer readable medium generally includes instructions stored thereon, the instructions executable by one or more processors, for: controlling when the UE is placed in a low power state in the first RAN based, at least in part, on inactivity of the UE in the first RAN and controlling when to modify one or more network bearers between the first RAN or the second RAN and the core network based, at least in part, on at least one of inactivity on the one or more network bearers or inactivity in both the first RAN and the second RAN.

Certain aspects of the present disclosure provide a method for wireless communications by a UE capable of communicating with a core network via at least a first RAN and a second RAN. The method generally includes establishing a connection to the core network via the second RAN and determining whether or not to send a request for entry into a low power state in the first RAN based, at least in part, on activity in the second RAN, wherein said determining comprises: suppressing transmission of the request if there is activity in the second RAN or requesting to enter a low-power connected state (DRX), or requesting to enter an idle state, based on activity in the second RAN.

Certain aspects of the present disclosure provide an apparatus for wireless communications with a UE capable of communicating with a core network via at least a first RAN and a second RAN. The apparatus generally includes at least one processor configured to: establish a connection to the core network via the second RAN and determine whether or not to send a request for entry into a low power state in the first RAN based, at least in part, on activity in the second RAN, wherein said determining comprises: suppressing transmission of the request if there is activity in the second RAN, or requesting to enter a low-power connected state (DRX) or requesting to enter an idle state, based on activity in the second RAN.

Aspects of the present disclosure generally include methods, apparatus, systems, computer program products, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
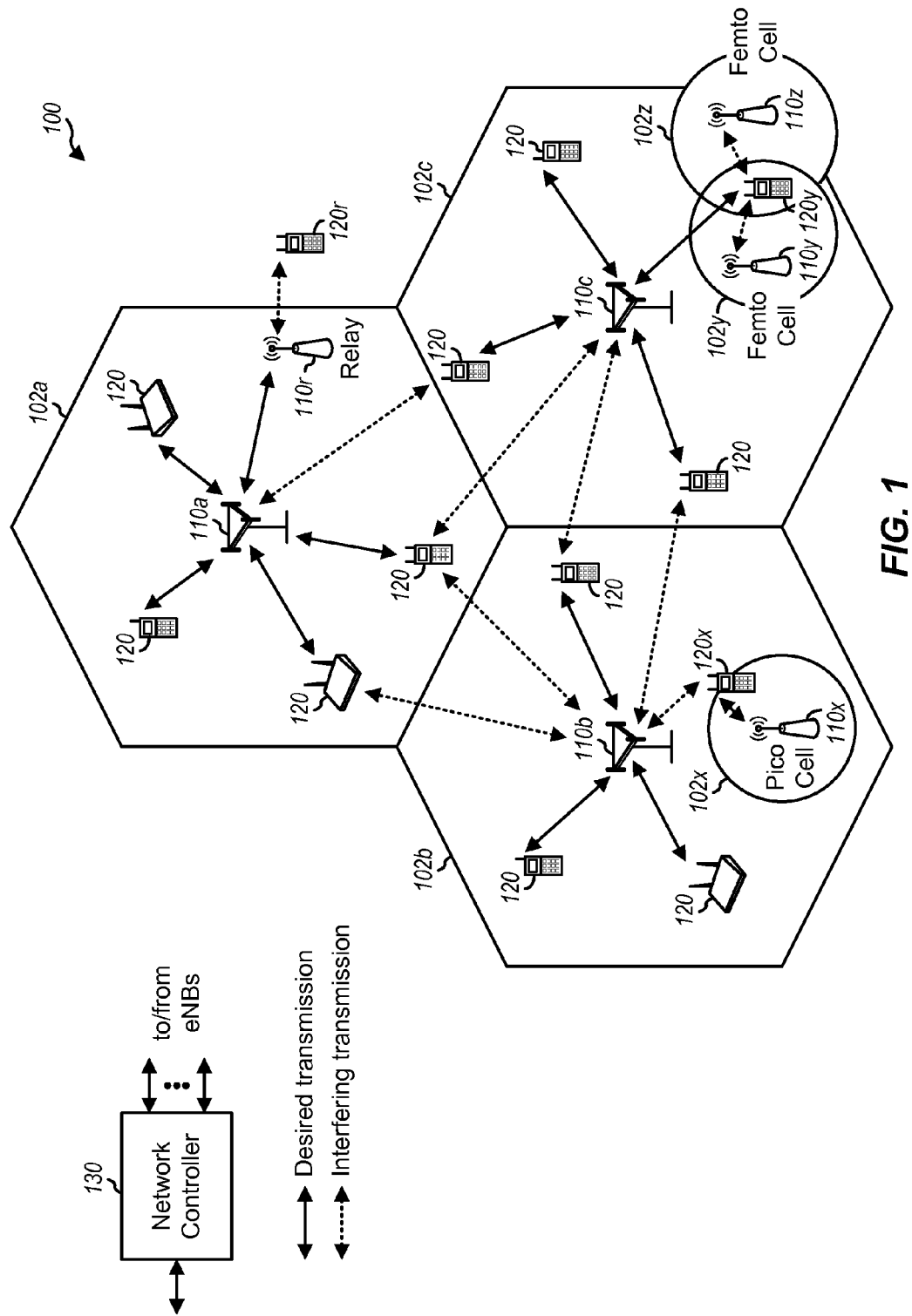
FIG. 1 illustrates a multiple access wireless communication system, in accordance with certain aspects of the present disclosure.

Certain aspects of the present disclosure generally relate to techniques and apparatus for power management for integrated radio access network (RAN) and wireless local area network (WLAN) systems that use Wi-Fi as an additional carrier for wireless communication. According to certain aspects provided herein, terminals that are connected to co-located Wi-Fi access points (APs) and base stations may utilize a Wi-Fi carrier for communication with the core network in addition to the cellular radio link. While using the Wi-Fi carriers, the terminals may attempt to power down the cellular radio links after a pre-determined period of inactivity on the cellular link. However, because traffic on the cellular radio link may not directly correspond to traffic inactivity on the network bearer, power management techniques that take into account whether an additional Wi-Fi carrier is activated are desirable.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR), cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Example Wireless Communication Network

FIG. 1 shows a wireless communication network 100, which may be an LTE network. The wireless network 100 may include a number of evolved Node Bs (eNBs) 110 and other network entities. An eNB may be a station that communicates with the UEs and may also be referred to as a base station, an access point, etc. A Node B is another example of a station that communicates with the UEs.

Each eNB 110 may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB. In the example shown in FIG. 1, the eNBs 110a, 110b and 110c may be macro eNBs for the macro cells 102a, 102b and 102c, respectively. The eNB 110x may be a pico eNB for a pico cell 102x. The eNBs 110y and 110z may be femto eNBs for the femto cells 102y and 102z, respectively. An eNB may support one or multiple (e.g., three) cells.

The wireless network 100 may also include relay stations. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with the eNB 110a and a UE 120r in order to facilitate communication between the eNB 110a and the UE 120r. A relay station may also be referred to as a relay eNB, a relay, etc.

The wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 Watts) whereas pico eNBs, femto eNBs and relays may have a lower transmit power level (e.g., 1 Watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, etc. A UE may be able to communicate with macro eNBs, pico eNBs, femto eNBs, relays, etc. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

The wireless network 100 may also include UEs 120 capable of communicating with a core network via one or more radio access networks (RANs) that implement one or more radio access technologies (RATs). For example, according to certain aspects provided herein, the wireless network 100 may include co-located access points (APs) and/or base stations that provide communication through a first RAN implementing a first RAT and a second RAN implementing a second RAT. According to certain aspects, the first RAN may be a wide area wireless access network (WWAN) and the second RAN may be a wireless local area network (WLAN). Examples of WWAN may include, but not be limited to, for example, radio access technologies (RATs) such as LTE, UMTS, cdma2000, GSM, and the like. Examples of WLAN may include, but not be limited to, for example, RATs such as Wi-Fi or IEEE 802.11 based technologies, and the like.

Figure 8:
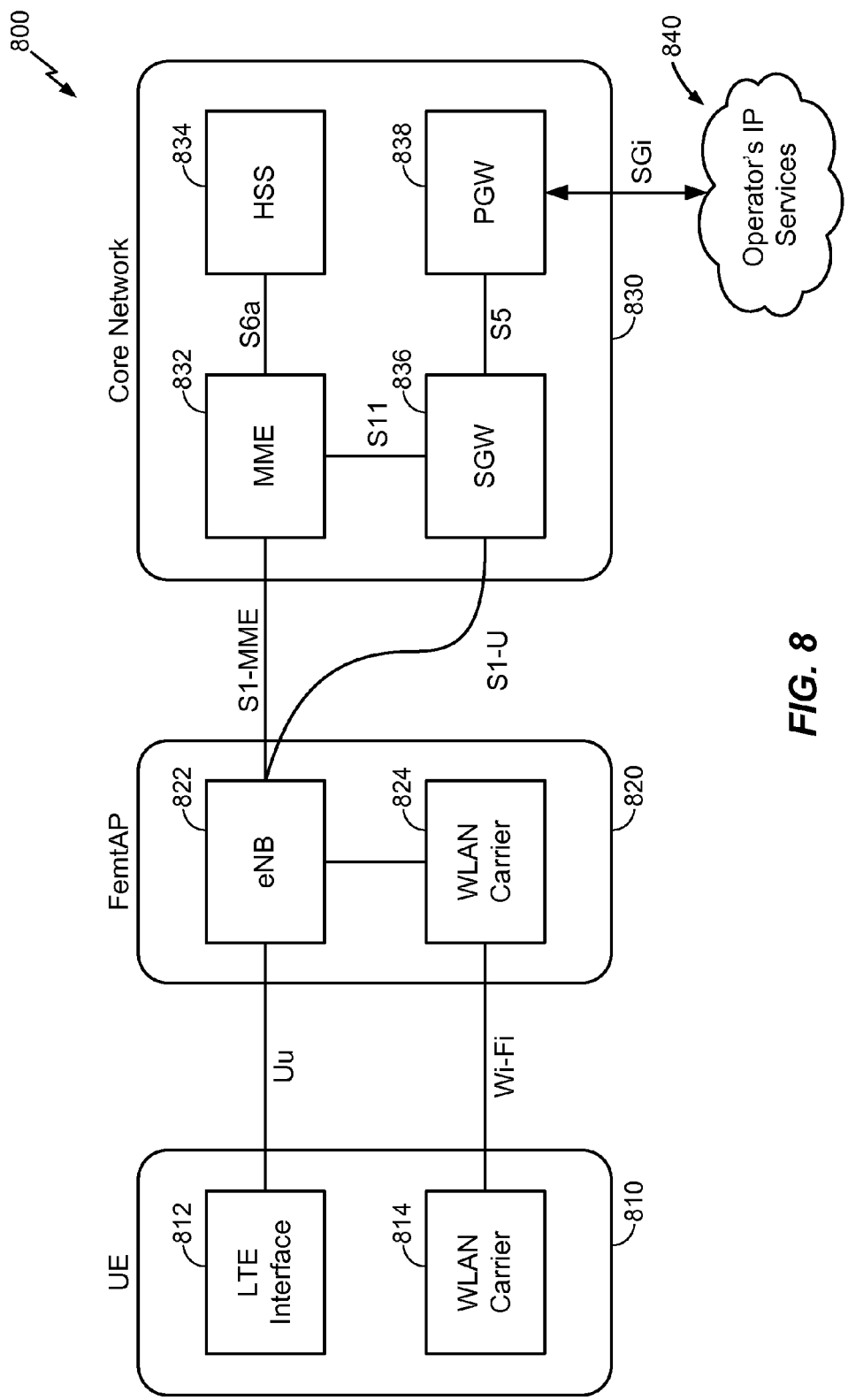
FIG. 8 illustrates an example wireless communication system utilizing multiple RANs, in accordance with certain aspects of the present disclosure.

According to certain aspects provided herein, the wireless network 100 may include co-located Wi-Fi access points (APs) and femto eNBs (e.g., as illustrated in FIG. 8) that provide communication through Wi-Fi and cellular radio links. As used herein, the term "co-located" generally means "in close proximity to," and applies to Wi-Fi APs or femto eNBs within the same device enclosure or within separate devices that are in close proximity to each other. According to certain aspects of the present disclosure, as used herein, the term "femtAP" may refer to a co-located Wi-Fi AP and femto eNB.

Figure 2:
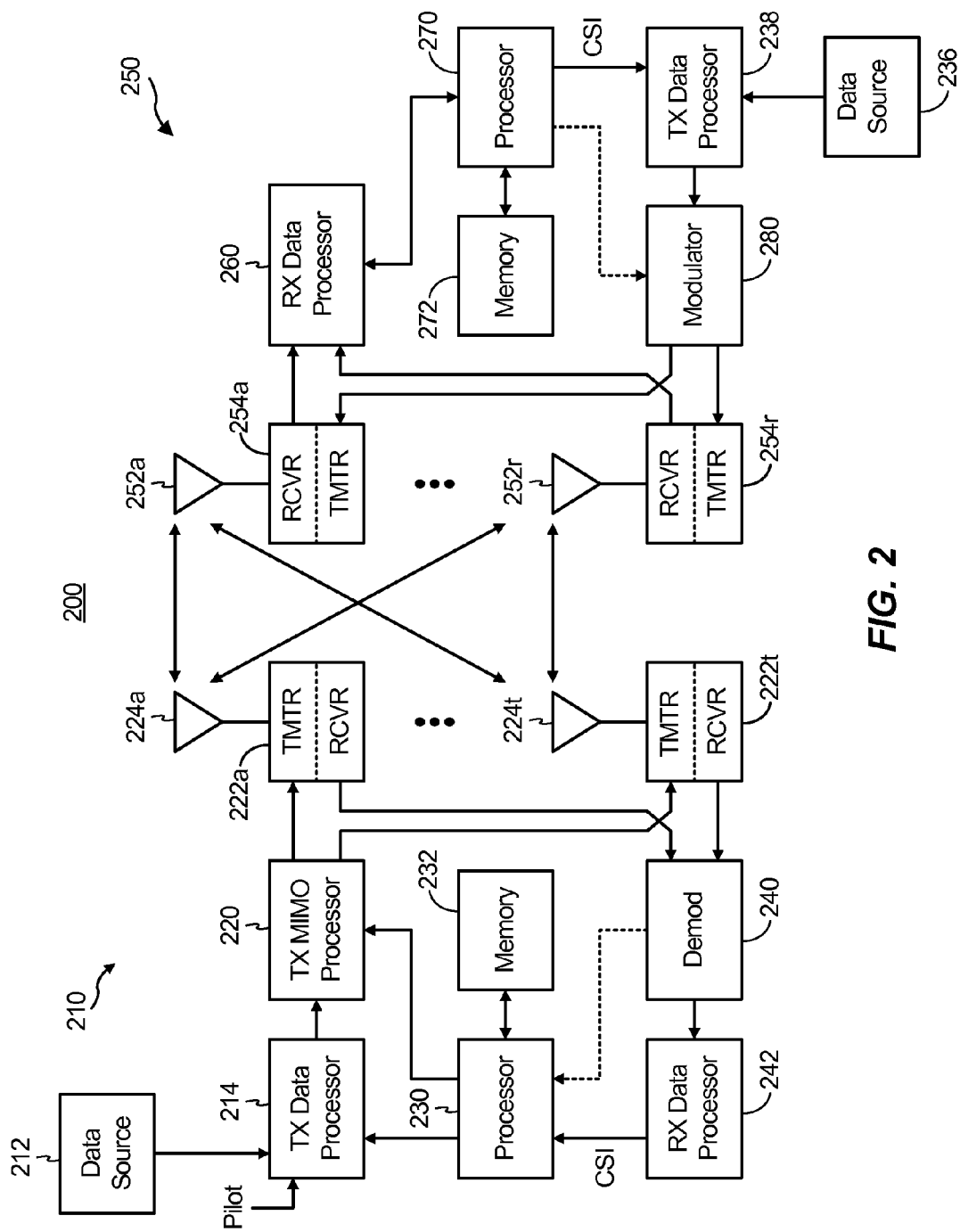
FIG. 2 is a block diagram of a communication system, in accordance with certain aspects of the present disclosure.

FIG. 2 is a block diagram of an embodiment of a transmitter system 210 (also known as an access point (AP)) and a receiver system 250 (also known as an user equipment (UE)) in a MIMO system 200. At the transmitter system 210, traffic data for a number of data streams is provided from a data source 212 to a transmit (TX) data processor 214.

In an aspect, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r, and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use. Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights and then processes the extracted message.

According to certain aspects, the controllers/processors 230 and 270 may direct the operation at the transmitter system 210 and the receiver system 250, respectively. According to an aspect, the processor 230, TX data processor 214, and/or other processors and modules at the transmitter system 210 may perform or direct operations 1100 in FIG. 11 and/or other processes for the techniques described herein. According to another aspect, the processor 270, RX data processor 260, and/or other processors and modules at the receiver system 250 may perform or direct operations 1000 in FIG. 10, operations 1300 in FIG. 13, operations 1400 in FIG. 14, operations 1500 in FIG. 15 and/or other processes for the techniques described herein.

In an aspect, logical channels are classified into Control Channels and Traffic Channels. Logical Control Channels comprise Broadcast Control Channel (BCCH), which is a DL channel for broadcasting system control information. Paging Control Channel (PCCH) is a DL channel that transfers paging information. Multicast Control Channel (MCCH) is a point-to-multipoint DL channel used for transmitting Multimedia Broadcast and Multicast Service (MBMS) scheduling and control information for one or several MTCHs. Generally, after establishing an RRC connection, this channel is used by UEs that receive MBMS (Note: old MCCH+MSCH). Dedicated Control Channel (DCCH) is a point-to-point bi-directional channel that transmits dedicated control information used by UEs having an RRC connection. In an aspect, Logical Traffic Channels comprise a Dedicated Traffic Channel (DTCH), which is a point-to-point bi-directional channel, dedicated to one UE, for the transfer of user information. Also, a Multicast Traffic Channel (MTCH) is a point-to-multipoint DL channel for transmitting traffic data.

In an aspect, Transport Channels are classified into DL and UL. DL Transport Channels comprise a Broadcast Channel (BCH), Downlink Shared Data Channel (DL-SDCH), and a Paging Channel (PCH), the PCH for support of UE power saving (DRX cycle is indicated by the network to the UE), broadcasted over entire cell and mapped to PHY resources which can be used for other control/traffic channels. The UL Transport Channels comprise a Random Access Channel (RACH), a Request Channel (REQCH), an Uplink Shared Data Channel (UL-SDCH), and a plurality of PHY channels. The PHY channels comprise a set of DL channels and UL channels.

In an aspect, a channel structure is provided that preserves low PAPR (at any given time, the channel is contiguous or uniformly spaced in frequency) properties of a single carrier waveform.

For the purposes of the present document, the following abbreviations apply:
AM Acknowledged Mode
AMD Acknowledged Mode Data
ARQ Automatic Repeat Request
BCCH Broadcast Control CHannel
BCH Broadcast CHannel
C- Control-
CCCH Common Control CHannel
CCH Control CHannel
CCTrCH Coded Composite Transport Channel
CP Cyclic Prefix
CRC Cyclic Redundancy Check
CTCH Common Traffic CHannel
DCCH Dedicated Control CHannel
DCH Dedicated CHannel
DL DownLink
DL-SCH DownLink Shared CHannel
DM-RS DeModulation-Reference Signal
DSCH Downlink Shared CHannel
DTCH Dedicated Traffic CHannel
FACH Forward link Access CHannel
FDD Frequency Division Duplex
L1 Layer 1 (physical layer)
L2 Layer 2 (data link layer)
L3 Layer 3 (network layer)
LI Length Indicator
LSB Least Significant Bit
MAC Medium Access Control
MBMS Multimedia Broadcast Multicast Service
MCCH MBMS point-to-multipoint Control CHannel
MRW Move Receiving Window
MSB Most Significant Bit
MSCH MBMS point-to-multipoint Scheduling CHannel
MTCH MBMS point-to-multipoint Traffic CHannel
PCCH Paging Control CHannel
PCH Paging CHannel
PDU Protocol Data Unit
PHY PHYsical layer
PhyCH Physical CHannels
RACH Random Access CHannel
RB Resource Block
RLC Radio Link Control
RRC Radio Resource Control
SAP Service Access Point
SDU Service Data Unit
SHCCH SHared channel Control CHannel
SN Sequence Number
SUFI SUper FIeld
TCH Traffic CHannel
TDD Time Division Duplex
TFI Transport Format Indicator
TM Transparent Mode
TMD Transparent Mode Data
TTI Transmission Time Interval
U- User-
UE User Equipment
UL UpLink
UM Unacknowledged Mode
UMD Unacknowledged Mode Data
UMTS Universal Mobile Telecommunications System
UTRA UMTS Terrestrial Radio Access
UTRAN UMTS Terrestrial Radio Access Network
MBSFN Multimedia Broadcast Single Frequency Network
MCE MBMS Coordinating Entity
MCH Multicast CHannel
MSCH MBMS Control CHannel
PDCCH Physical Downlink Control CHannel
PDSCH Physical Downlink Shared CHannel
PRB Physical Resource Block
VRB Virtual Resource Block In addition, Rel-8 refers to Release 8 of the LTE standard.

Figure 3:
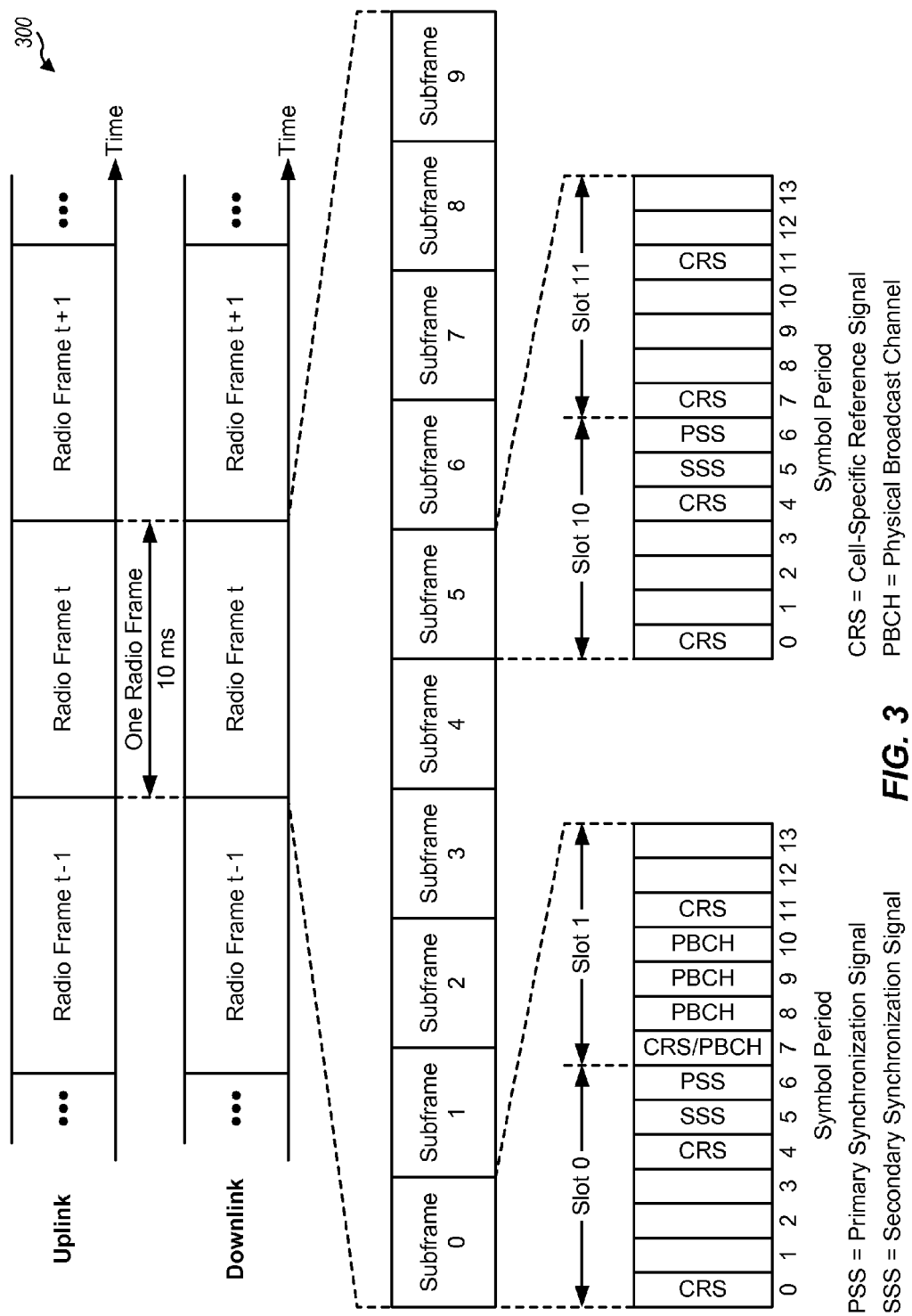
FIG. 3 illustrates an example frame structure, in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. During cell search and acquisition the terminal detects the cell frame timing and the physical-layer identity of the cell from which the terminal learns the start of the references-signal sequence (given by the frame timing) and the reference-signal sequence of the cell (given by the physical layer cell identity). The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a Physical Broadcast Channel (PBCH) in symbol periods 0 to 3 in slot 1 of certain radio frames. The PBCH may carry some system information. The eNB may transmit other system information such as System Information Blocks (SIBs) on a Physical Downlink Shared Channel (PDSCH) in certain subframes. The eNB may transmit control information/data on a Physical Downlink Control Channel (PDCCH) in the first B symbol periods of a subframe, where B may be configurable for each subframe. The eNB may transmit traffic data and/or other data on the PDSCH in the remaining symbol periods of each subframe.

Figure 4:
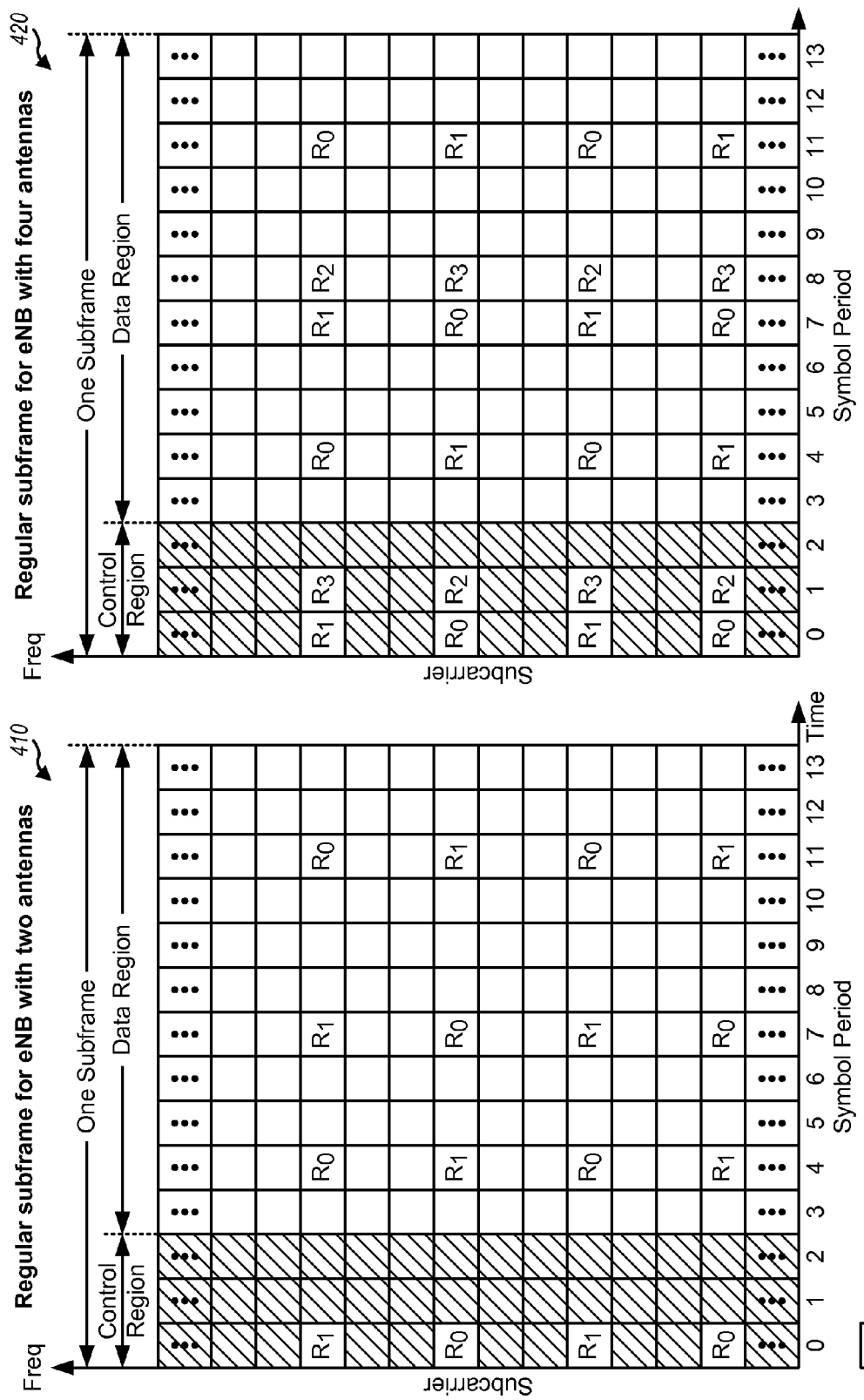
FIG. 4 illustrates an example subframe resource element mapping, in accordance with certain aspects of the present disclosure.

FIG. 4 shows two exemplary subframe formats 410 and 420 for the downlink with the normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for an eNB equipped with two antennas. A CRS may be transmitted from antennas 0 and 1 in symbol periods 0, 4, 7 and 11. A reference signal is a signal that is known a priori by a transmitter and a receiver and may also be referred to as a pilot. A CRS is a reference signal that is specific for a cell, e.g., generated based on a cell identity (ID). In FIG. 4, for a given resource element with label $R_a$, a modulation symbol may be transmitted on that resource element from antenna a, and no modulation symbols may be transmitted on that resource element from other antennas. Subframe format 420 may be used for an eNB equipped with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. Different eNBs may transmit their CRSs on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q∈{0, . . . , Q−1}.

The wireless network may support hybrid automatic retransmission (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage area of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering eNBs.

Carrier Aggregation

Figure 5:
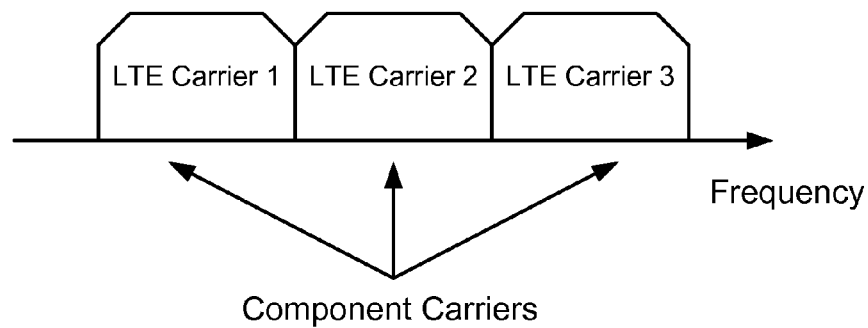
FIG. 5 illustrates continuous carrier aggregation, in accordance with certain aspects of the disclosure.
Figure 6:
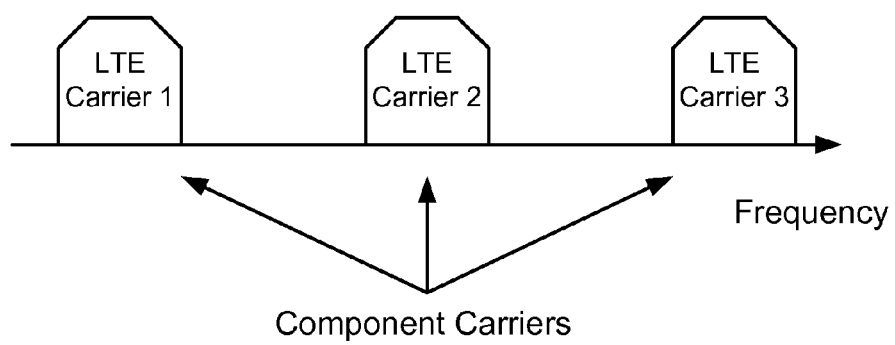
FIG. 6 illustrates non-continuous carrier aggregation, in accordance with certain aspects of the disclosure.
Figure 7:
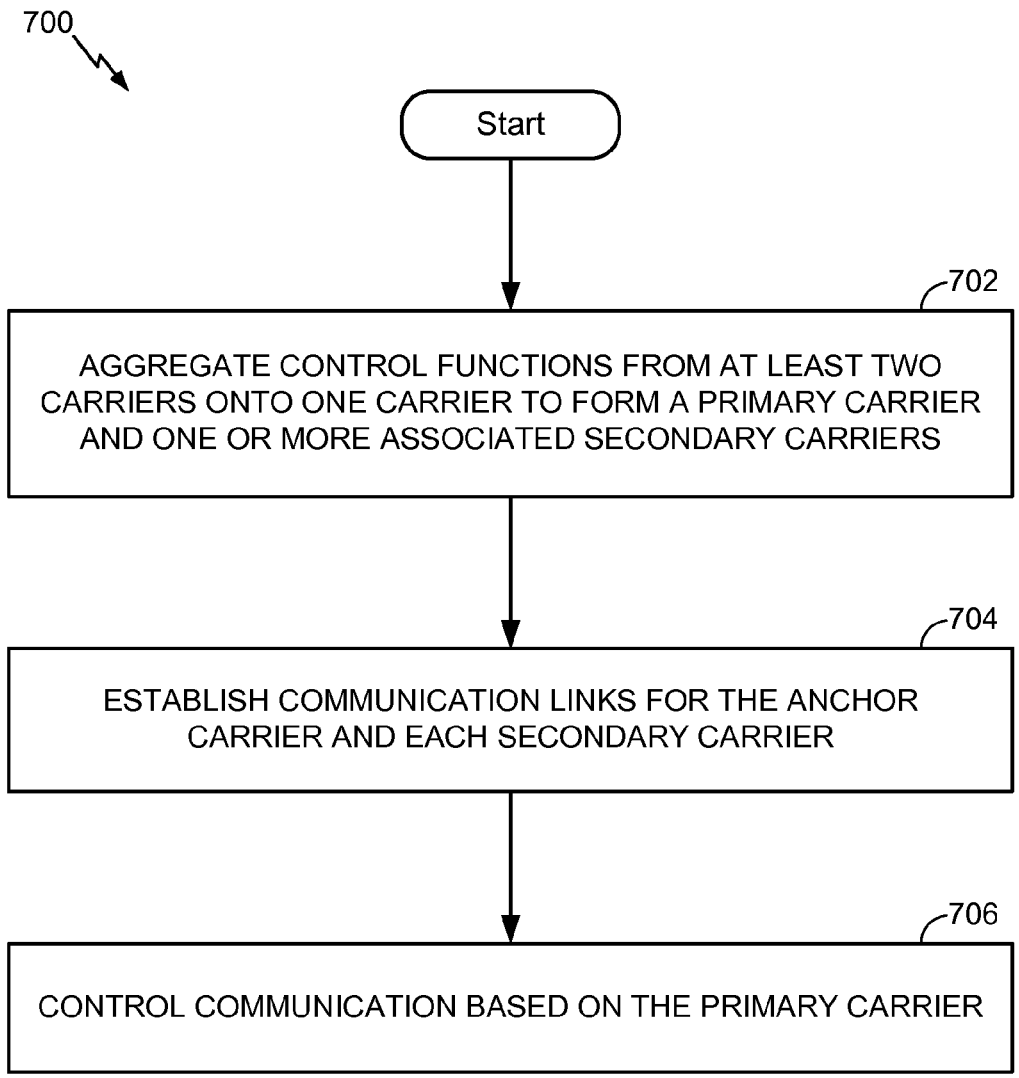
FIG. 7 illustrates example operations, in accordance with certain aspects of the disclosure.

LTE-Advanced (LTE-A) UEs may use spectrum of up to 20 MHz bandwidths allocated in a carrier aggregation of up to a total of 100 MHz (5 component carriers) used for transmission in each direction. For the LTE-Advanced mobile systems, two types of carrier aggregation (CA) methods have been proposed, continuous CA and non-continuous CA. They are illustrated in FIGS. 5 and 6. Non-continuous CA occurs when multiple available component carriers are separated along the frequency band (FIG. 6). On the other hand, continuous CA occurs when multiple available component carriers are adjacent to each other (FIG. 5). Both non-continuous and continuous CA aggregate multiple LTE/component carriers to serve a single unit of LTE Advanced UE. According to various embodiments, the UE operating in a multicarrier system (also referred to as carrier aggregation) is configured to aggregate certain functions of multiple carriers, such as control and feedback functions, on the same carrier, which may be referred to as a "primary carrier." The remaining carriers that depend on the primary carrier for support are referred to as associated secondary carriers. For example, the UE may aggregate control functions such as those provided by the optional dedicated channel (DCH), the nonscheduled grants, a physical uplink control channel (PUCCH), and/or a physical downlink control channel (PDCCH). FIG. 7 illustrates a method 700 for controlling radio links in a multiple carrier wireless communication system by grouping physical channels according to one example. As shown, the method 700 includes, at 702, aggregating control functions from at least two carriers onto one carrier to form a primary carrier and one or more associated secondary carriers. Next at 704, communication links are established for the primary carrier and each secondary carrier. Then, at 706, communication is controlled based on the primary carrier.

Wi-Fi as an Additional Carrier

Certain aspects of the present disclosure provide for the use of Wi-Fi as an additional carrier (e.g., in addition to the cellular link) for wireless communication. For example, when connected to a femtAP, a UE may use a Wi-Fi link as an additional carrier to communicate with the cellular system core network in order to achieve seamless mobility between the cellular system and Wi-Fi system, or to achieve higher throughput through bandwidth aggregation across both systems.

FIG. 8 shows an example in which a UE uses Wi-Fi as an additional carrier in a wireless communication system 800, according to certain aspects of the present disclosure. The wireless communication system 800 may include one or more UE(s) 810, a femtAP 820 (i.e., a co-located Wi-Fi AP 824 and femto eNB 822), a core network 830, and an Operator's IP Services 840. According to aspects of the present disclosure, the wireless communication system 800 may provide connectivity through one or more radio access networks (RANs). For example, as illustrated in FIG. 8, according to certain aspects, the UE 810 of the wireless communication system 800 may include a long term evolution (LTE) interface 812 for communicating over a first RAN. For example, the UE 110 may communicate with a femto eNB 822 of femtAP 820 via link "Uu" (which may be a cellular radio link such as LTE). The UE 810 may also support wireless local area network (WLAN) carrier 814 for communicating over a second RAN. For example, the UE 110 may communicate with a WLAN carrier, for example, Wi-Fi AP 824 of the femtAP 820 via Wi-Fi. According to certain aspects, femto eNB 822 provides connectivity through a first RAN (e.g., LTE) for femtAP 820 and Wi-Fi AP 824 provides connectivity through a second RAN (e.g., WLAN) for femtAP 820.

As shown, the wireless communication system 800 provides connectivity through LTE and Wi-Fi between a UE and a core network through a femtAP, however, as those skilled in the art will readily appreciate, the various concepts presented throughout this disclosure may also be extended to other RANs implementing other RATs (e.g., GSM, cdma200, and the like).

According to an aspect, one or more UE(s) 810 and femtAP(s) 820 may communicate with the core network 830. The femtAP 820 may be connected by an S1 interface to the core network 830. The core network 830 may include a Mobility Management Entity (MME) 832, a Home Subscriber Server (HSS) 834, a Serving Gateway (SGW) 836 and a Packet Data Network (PDN) Gateway 838. The MME 832 is the control node that processes the signaling between the UE 810 and the core network 830. The MME 832 may also perform various functions such as mobility management, bearer management, distribution of paging messages, security control, authentication, gateway selection, etc. eNB 822 may communicate with the MME 832 via an S1-MME link and with SGW 836 via S1-U link. The HSS 834 is connected to the MME 832 and may perform various functions such as authentication and authorization of the UE 810 and may provide location and IP information to the MME 832. The SGW 836 may transfer user IP packets to the PDN Gateway 838 and may perform various functions such as packet routing and forwarding, mobility anchoring, packet buffering, initiation of network-triggered services, etc. The PDN Gateway 838 is connected to the Operator's IP Services 840 and may provide UE IP address allocation as well as other functions. The Operator's IP Services 840 may include the Internet, the Intranet, an IP Multimedia Subsystem (IMS), and a PS Streaming Service (PSS). According to certain aspects, as described in greater detail below, it may be desirable for the UE, when using Wi-Fi as an additional carrier to communicate with the core network, to enter a low-power state on the cellular link after a specified period of traffic inactivity on the cellular link.

Dormancy Management in Cellular Systems

According to certain aspects, in 3GPP cellular systems (e.g., similar to wireless communication system 800), a UE (e.g., UE 810) may be in a high-power state (e.g., radio resource control (RRC) connected) while involved in active exchange of traffic, and may enter a low-power state (e.g., RRC idle) after a specified period of traffic inactivity.

According to certain aspects, at the UE 810, the trigger to enter the low-power state is generally the arrival of a dormancy indication from the core network (e.g., core network 830). The dormancy indication may be sent when the core network 830 determines that there has been no traffic for the UE 810 for a certain period of time. The dormancy indication may also be sent in response to a request from the UE 810 itself (e.g., a signalling connection release indication (SCRI) message), which exists in UMTS but not in LTE.

The transmission of the dormancy indication may be accompanied with the release of some resources, associated with the UE 810, on the radio link and/or within the core network 830. In particular, according to certain aspects provided herein, depending on the exact dormancy state to which the UE 810 is sent, the radio connection (e.g., Uu between the UE 810 and femto eNB 822) and the network bearer (e.g., S1-MME link or S1-U between the femtAP 820 and the core network 830) may or may not be torn down. There may also be differences among states regarding whether the data plane (e.g., the S1-U link between the eNB 822 and SGW 836) and control plane (e.g., the S1-MME between the eNB 822 and MME 832) are torn down or whether only the data plane is torn down.

According to certain aspects of the present disclosure, the dormancy states may include a low-power connected mode and an idle mode.

Low-Power Connected Mode:

The low-power connected mode is a dormancy mode where the UE 810 may go to a low-power state while the connection between the femtAP 820 and core network 830 (i.e., the network bearer) remains up.

The cellular standards define such low-power connected mode operation. For example, in LTE, the connected-mode discontinuous reception (DRX) allows the UE 810 to power down the radio when there is no traffic on the radio link, except for periodic wake-ups. The network bearer remains up during this period. According to another example, in high speed packet access (HSPA), continuous packet connectivity (CPC) and enhanced UE DRX may be used to achieve similar behavior. The cell paging channel (Cell-PCH), UTRAN registration area paging channel (URA-PCH), forward access channel (FACH) and enhanced FACH (E-FACH) RRC states in UMTS may also be included in this mode, since the UE 810 may be allowed to enter a low-power state while the core network 830 still thinks the UE 810 is in a connected mode and the network bearer remains up.

In general, according to aspects of the present disclosure, a UE 810 in a low-power connected state may be sent to idle mode, as discussed in more detail in the next section, if inactivity on the cellular link lasts beyond a specified duration. At this point, the network bearer (e.g., the connection between the femtAP 820 and the core network 830) is typically torn down.

Idle Mode:

The idle mode is a dormancy mode where the UE 810 may go into a low-power state, the network bearer is torn down, and the UE 810 location is not known at a cell-level, but is known at a tracking area level. The RRC state is idle, and therefore the network may not send NAS messages to the UE 810. The network 830 may page the UE 810 and, once the UE 810 sets up the RRC connection, the network 830 may send non-access stratum (NAS) messages to the UE 810.

According to certain aspects of the present disclosure, the use of an additional Wi-Fi carrier (e.g., as in the wireless communications system 800) may impact dormancy management. For example, when there is no Wi-Fi carrier in use, traffic inactivity on the cellular radio link may directly correspond to traffic inactivity in the network bearer. Therefore, the determination of when to send a UE to dormancy could be made based on either inactivity over the cellular air interface or inactivity over the network bearer. However, in some cases, as described in greater detail below with respect to FIG. 9, when the UE is communicating with the core network using an additional Wi-Fi carrier, inactivity over the cellular radio link may not imply inactivity over the network bearer, since traffic may still flow via the Wi-Fi carrier.

Figure 9:
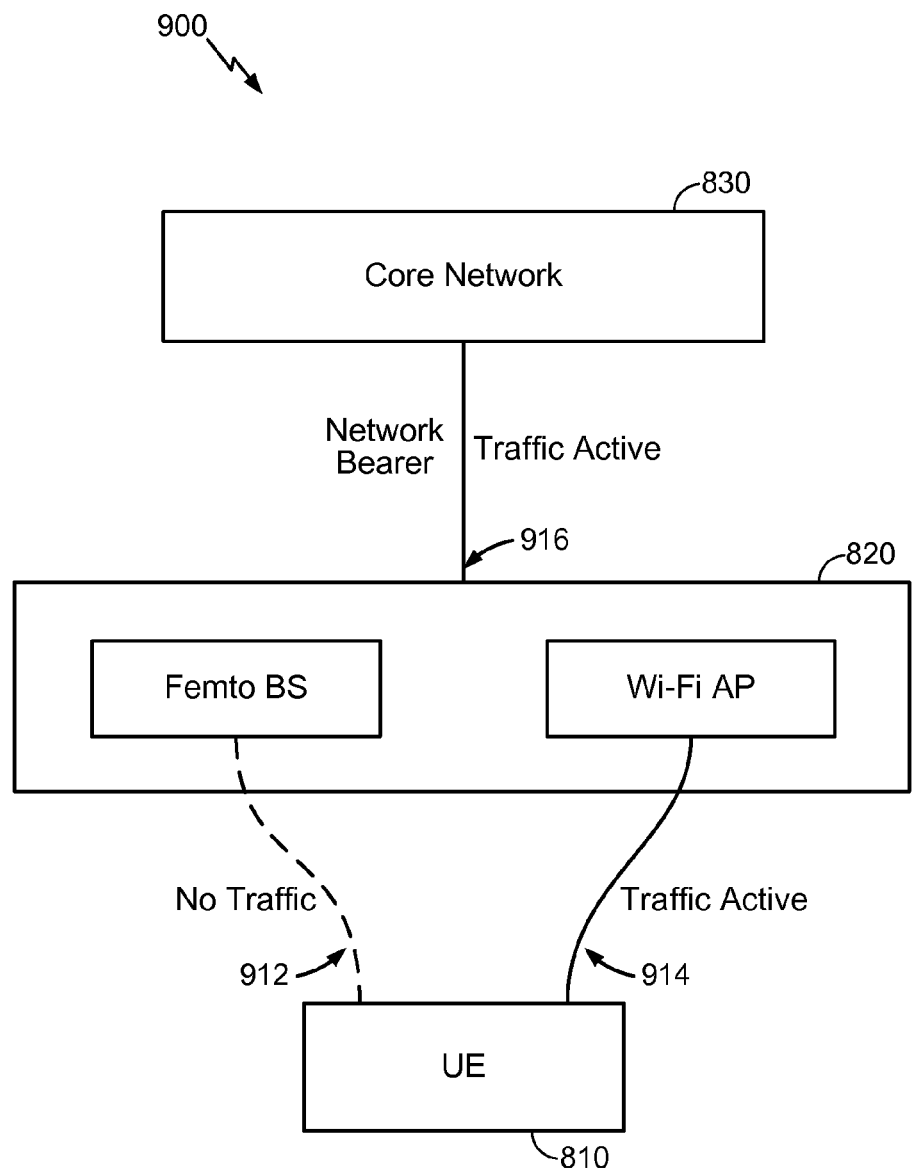
FIG. 9 illustrates an example of a user equipment (UE) operating with an additional Wi-Fi carrier in a wireless communication system, in accordance with certain aspects of the present disclosure.

FIG. 9 illustrates an example of a UE operating with an additional Wi-Fi carrier in a wireless communication system, in accordance with certain aspects of the present disclosure. As shown in FIG. 9, if the cellular radio link 912 (e.g., the link Uu in FIG. 8) between the UE 810 and femtAP 820 is not being used for data transfers, all traffic may flow over the Wi-Fi carrier 914 instead. Thus, it may be desirable for the UE 810 to be sent to a low-power state on the cellular side in order to reduce power consumption. However, because UE 810 uses the additional Wi-Fi carrier, traffic may still be flowing over the network bearer 916 (e.g., the S1-MME link or S1-U link in FIG. 8). Therefore, if the traffic over the network bearer 916 is used to determine inactivity, then the UE 810 may not be sent to dormancy over the cellular radio link 912 even though the cellular radio link 912 is inactive. On the other hand, if traffic over the cellular radio link 912 is used to determine inactivity, then the UE 810 may be sent to dormancy even while traffic is flowing over the network bearer 916 through the Wi-Fi carrier 914. Depending on the dormancy state that the UE 810 is sent to, the network bearer 916 may be torn down and this could result in the disruption of traffic.

Additionally, in the case the UE 810 is using both the cellular radio link 912 for data transfers in addition to the Wi-Fi carrier 914, it may be desirable not to send the UE 810 to a low-power state on the cellular side.

Thus, it may be desirable that while a UE is exchanging traffic with the cellular core network using an additional Wi-Fi carrier, the network bearer not be brought down by any dormancy mechanisms. In other words, it may be desirable that if the UE is using both cellular link and the additional Wi-Fi carrier, the UE may not enter any dormancy, however, if the UE is using the Wi-FI, but not the cellular link, the UE may be sent to a low-power connected mode. It may be desirable that only if the UE is not exchanging any traffic with the core network at all (i.e., over either the cellular link or the Wi-Fi carrier), then the radio and the network bearer resources may be released after a certain period of inactivity.

Example Modified Dormancy Management when Wi-Fi Carrier is Activated

According to aspects of the present disclosure, techniques and apparatus are provided for dormancy management configuration when an additional Wi-Fi carrier is activated.

As described in greater detail below, aspects of the present disclosure may take several forms depending on the cellular system and which dormancy states the network and the UE may support. Some of the different possibilities are described below, along with alternative solutions in each case; however, the list of possibilities and solutions is not meant to be exhaustive.

Example Modified Dormancy Management when Wi-Fi Carrier is Activated and Low-Power Connected Mode and Idle Mode are Supported In general, the core network (e.g., core network 830) and the user equipment (UE) (e.g., UE 810) may support at least one type of low-power connected mode, as well as the idle mode. Conventionally, the trigger to activate the low-power connected mode or the idle mode is usually based on inactivity over the cellular radio link (e.g., the link Uu or link 912). Referring again to FIG. 9, aspects of the present disclosure may provide techniques and apparatus for entry into low-power connected mode, for entry into an idle mode, and/or for signalling connection release indication (SCRI) handling when an additional Wi-Fi carrier (e.g., link 914) is activated. According to certain aspects of the present disclosure, the trigger to tear down the network bearer (e.g., network bearer 916) may take into consideration whether the Wi-Fi carrier is active or not active.

1. Example Modified Entry into Low-Power Connected Mode

According to certain aspects of the present disclosure, where low-power connected mode and idle mode are supported, various techniques are provided for entry into the low-power connected mode.

According to certain aspects, when communication over the Wi-Fi carrier 914 is initiated, instead of waiting for inactivity on cellular link 912, the network 830 may send a UE 810 to the low-power connected mode on the cellular radio link 912 as soon as the traffic routing switches from cellular (e.g., the first RAN) to Wi-Fi (e.g., the second RAN). For example, when traffic on the cellular radio link 912 changes to the Wi-Fi carrier 914, it may be known or assumed that no traffic is expected to flow on the cellular radio link 912. Therefore, there may be no need to wait for inactivity on the cellular radio link 912 before enabling the low-power connected mode. More generally, the network 830 may modify (for example, reduce to zero) the value of the inactivity timeout in response to the switching of traffic routing. This technique may trigger dormancy earlier and thus may reduce power consumption.

According to certain aspects, when communication over the Wi-Fi carrier 914 is initiated, the trigger to enable the low-power connected state may be based on (or modified to be based on) inactivity on the cellular radio link 912 (e.g., the first RAN), and may not be based on inactivity on the network bearer 916. Thus, the UE 810 may enter low-power connected state based once the cellular radio link 912 is inactive, although traffic is still flowing over network bearer 916. According to certain aspects, once the Wi-Fi carrier 914 is deactivated, the trigger to enter low-power connected mode may be re-modified to be based on inactivity of the network bearer 916.

According to another implementation, low-power connected mode may be enabled on the cellular radio link 912 immediately upon successful Wi-Fi carrier initiation (e.g., the second RAN). This may be useful if it is known that the cellular radio link 912 may not be used while the Wi-Fi carrier 914 is initiated.

According to yet another implementation, the UE 810 may be kept in a connected high-power state until the Wi-Fi carrier 914 is deactivated (e.g., not enabling the low-power connected mode). This may be accomplished by sending keep-alive traffic on the cellular interface 912 to prevent any traffic inactivity timers from firing until the Wi-Fi carrier 914 is deactivated. Additionally or alternatively, the UE 810 may be kept in the connected high-power state by deactivating the trigger to enter the low-power connected state until the Wi-Fi carrier 914 is deactivated.

2. Example Modified Entry into Idle Mode

According to certain aspects of the present disclosure, where both low-power connected mode and idle are supported, various techniques for entry into idle mode are provided.

According to certain aspects, when communication over the Wi-Fi carrier 914 is initiated, the network 830 may not use traffic inactivity on the cellular link 912 as the trigger to send UE 810 from the low-power connected state to idle mode until the Wi-Fi carrier 914 is deactivated. Instead, entry into idle mode and the consequent teardown of the network bearer 916 may be based on network bearer 916 inactivity instead of based on cellular radio link 912 inactivity.

According to another implementation, when communication over the Wi-Fi carrier 914 is initiated, the entry into idle mode may be disabled until the Wi-Fi carrier 914 is deactivated. In other words, if the Wi-Fi carrier 914 may be initiated but does not have active traffic, then the UE 810 may remain in the low-power connected state.

Thus, by modifying entry into idle mode, the network bearer 916 may not be torn down while the Wi-Fi carrier 914 is still active. More generally, the value of the inactivity timeout to enter idle mode and teardown the network bearer 916 may be modified.

3. Example SCRI Handling

Certain aspects of the present disclosure provided herein also provide for SCRI handling. When the UE 810 sends a SCRI message to request dormancy, the network 830 may not send the UE 810 to idle mode based on cellular link 912 inactivity if the network bearer 916 is still active due to the Wi-Fi carrier 914. However, if the network bearer 916 is not carrying any traffic, then the UE 810 may be sent to idle mode.

Aspects of the present disclosure may provide various techniques for determining the UE trigger for sending requests to the network for entry into a dormant state (e.g., a SCRI request). According to an implementation, the transmission of the request may be suppressed if there is traffic on the Wi-Fi carrier 914 (e.g., second RAN). According to certain aspects, the condition for the UE 810 suppressing the request may be the Wi-Fi carrier 914 being initiated, instead of traffic being exchanged on the Wi-Fi carrier 914.

According to another implementation, if there is traffic on the Wi-Fi carrier 914, the UE 810 may specify in the request that the request is to enter a low-power connected state (e.g., DRX) and not an idle state. According to certain aspects, the condition for the UE 810 sending the request may be the Wi-Fi carrier 914 being initiated, instead of traffic being exchanged on the Wi-Fi carrier 914.

According to another implementation, in addition to the UE 910 specifying in the request that the request is to enter a low-power connected state and not an idle state if there is traffic on the Wi-Fi carrier 914, if there is no traffic on the Wi-Fi carrier 914 (not shown), the UE 810 may specify in the message that the request is to enter the idle state.

Aspects of the present disclosure may provide various techniques for determining the network 830 behaviour upon receiving a UE request for entry into a dormant state. According to an implementation, if there is no traffic activity on the cellular radio link 912, but there is traffic on the network bearer 916, then the UE 810 may be sent to a low-power connected state; and if there is no traffic on any link (e.g., Wi-Fi carrier 914, cellular radio link 912, or the network bearer 916), then the UE 810 may be sent to idle mode.

According to another implementation, if the UE 810 has specified a power state in its request message, then the UE 810 may be sent to a power state based on the state specified in the request.

According to yet another implementation, the request may be rejected while there is traffic on the Wi-Fi carrier 914. According to yet another implementation, the request may be rejected while the Wi-Fi carrier 914 is initiated, even if there is no traffic on the Wi-Fi carrier 914.

Aspects of the present disclosure provided herein are not meant to be limited by the implementations provided herein. In fact, aspects of the present disclosure provide for selecting any of the implementations provided herein or any combination of the implementations provided herein to manage power entry into one or more power states when an additional Wi-Fi carrier is active. For example, aspects of the present disclosure may provide for disabling all dormancy triggers during Wi-Fi carrier operation to ensure that the network bearer is not disturbed, which may correspond to a combination of (i) disabling the trigger to enter the low-power connected state until the Wi-Fi carrier is deactivated; and (ii) disabling the trigger to enter idle mode until the Wi-Fi carrier is deactivated.

Figure 10:
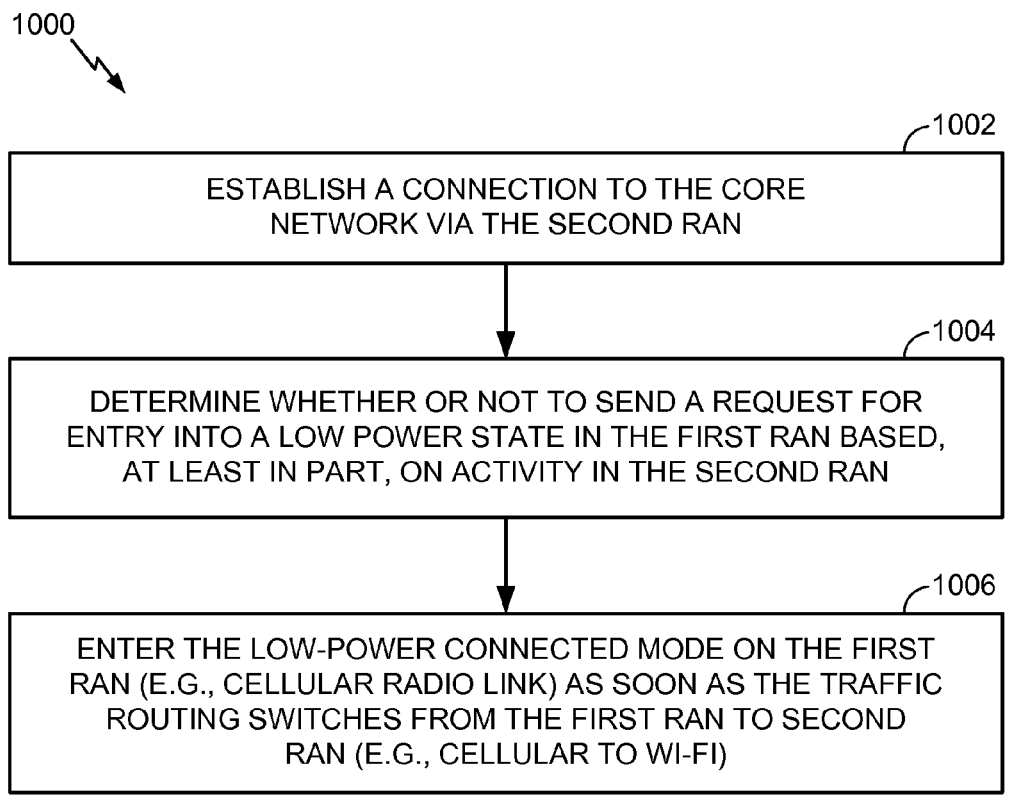
FIG. 10 illustrates example operations for wireless communications by a UE, in accordance with certain aspects of the present disclosure.
Figure 10A:
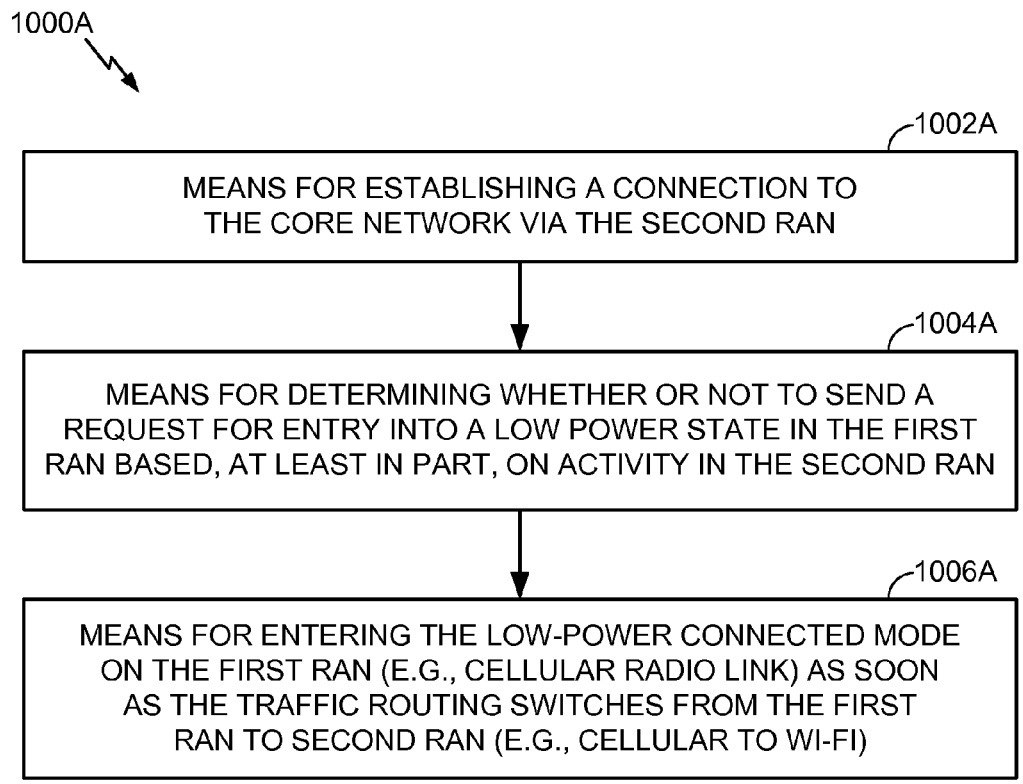
FIG. 10A illustrates example means capable of performing the operations shown in FIG. 10, in accordance with certain aspects of the present disclosure.

FIG. 10 illustrates example operations 1000 for wireless communications, in accordance with aspects of the present disclosure. According to aspects, the operation 1000 may be performed by a UE (e.g., such as UE 810) capable of communicating with a core network (e.g., core network 830) via at least a first RAN (e.g., LTE over cellular radio link 912) and a second RAN (e.g., WLAN over Wi-Fi link 914).

The operations 1000 may begin, at 1002, by establishing a connection to the core network via the second RAN. According to certain aspects, the first RAN may be a wide area wireless area network (WWAN) and the second RAN may be a WLAN.

At 1004, the UE may determine whether or not to send a request for entry into a low power state in the first RAN based, at least on, activity in the second RAN. As described above, according to aspects, the determining may comprise at least one of suppressing transmission of the request, requesting to enter a low-power connected state or requesting to enter an idle state based on whether or not the second RAN is active.

At 1006, the UE enters the low power state in the first RAN based, at least in part on, traffic routing switching between the first RAN and the second RAN. According to certain aspects, the UE may be instructed by the network to enter the low power state in the first RAN.

As described in further detail below, if the network and the UE do not support a low-power connected mode, then sending the UE to idle mode, in general, may be accompanied by bringing down the network bearer. To solve this problem, as mentioned above, aspects of the present disclosure provide for breaking down the dormancy mechanism into two steps: (1) sending the UE to a low power state (e.g., idle mode); and (2) tearing down the network bearer. According to certain aspects, the first step may be triggered by inactivity on the cellular radio link and the second step may be triggered by inactivity on the network bearer.

Figure 11:
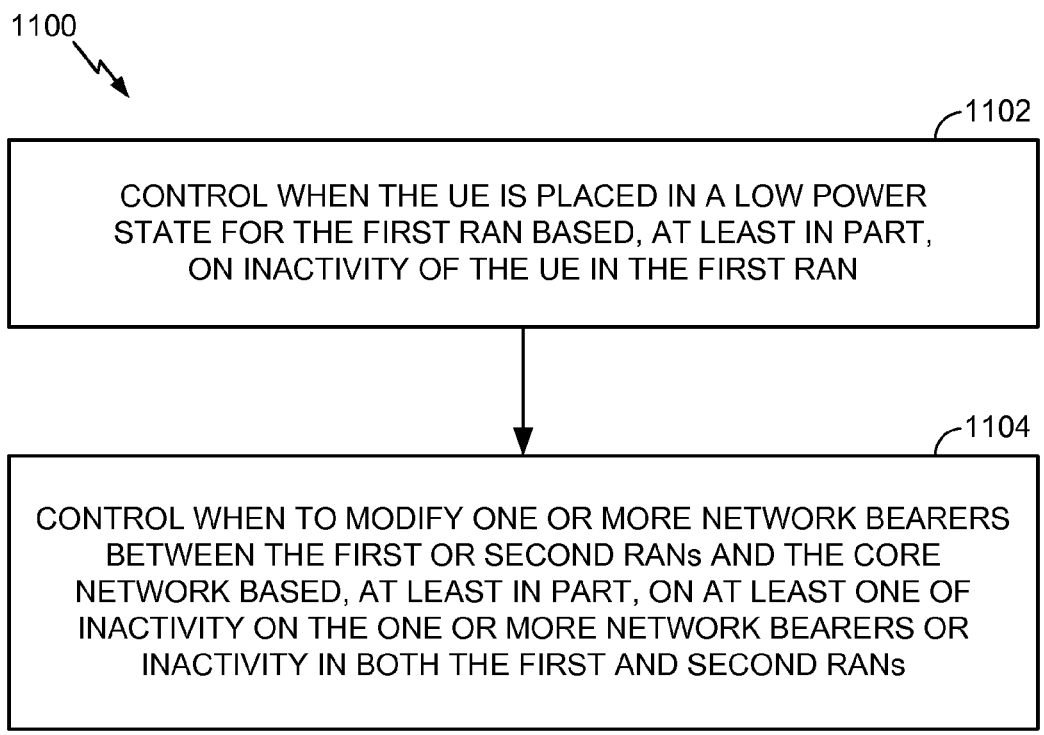
FIG. 11 illustrates example operations for wireless communications by a co-located Wi-Fi access point (APs) and femto e node B, in accordance with certain aspects of the present disclosure.
Figure 11A:
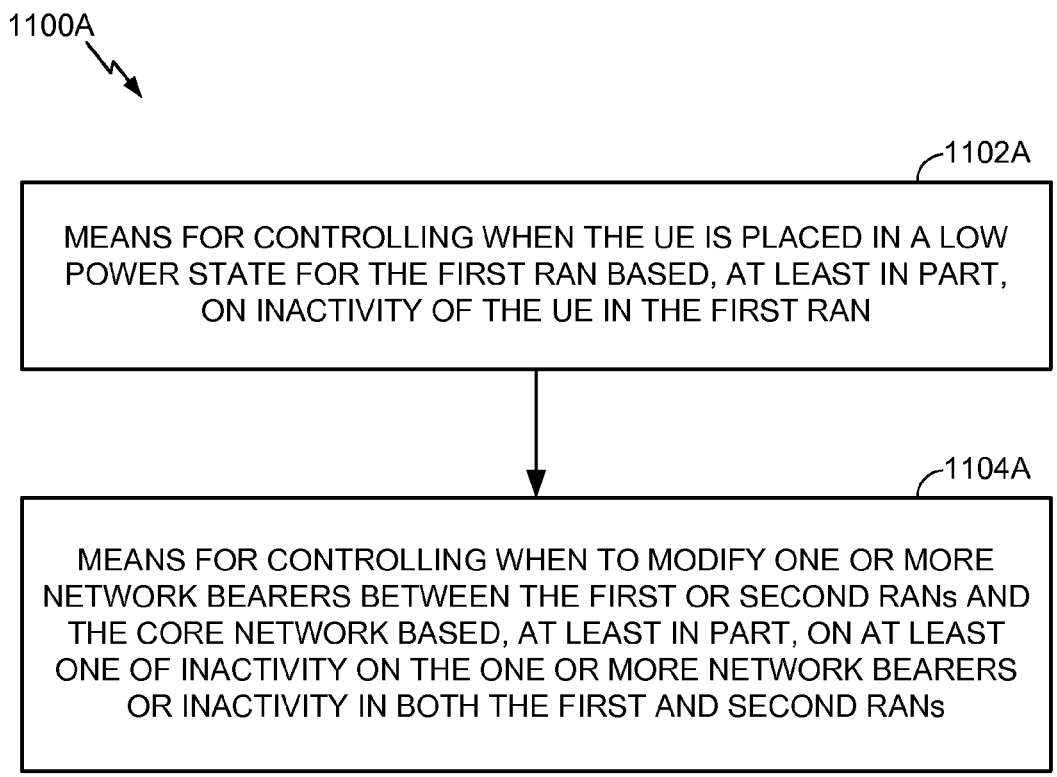
FIG. 11A illustrates example means capable of performing the operations shown in FIG. 11, in accordance with certain aspects of the present disclosure.

FIG. 11 illustrates example operations 1100 for wireless communications, in accordance with certain aspects of the present disclosure. According to aspects, the operations 1100 may be performed by a femtAP (e.g., such as femtAP 820).

The operations 1100 may begin, at 1102, by controlling when a UE is placed in a low power state (e.g., idle mode or low power connected mode) for a first RAN (e.g., WWAN) based, at least in part, on inactivity of the UE in the first RAN. For example, the femtAP may instruct or configure the UE to enter a low power connected state (e.g., discontinuous reception (DRX)) based on inactivity in the first RAN. Additionally or alternatively, the femtAP may determine triggers used to place the UE in an idle mode, based on inactivity of the UE in the first RAN. According to certain aspects, the femtAP may modify a value of an inactivity timeout trigger, in response to the traffic routing switching. According to certain aspects, the femtAP may place the UE in the low power state in the first RAN based on activating traffic routing in the second RAN.

At 1104, the femtAP may control when to modify one or more network bearers between the first RAN or a second RAN (e.g., WLAN) and a core network based, at least in part, on at least one of inactivity on the one or more network bearers or inactivity in both the first RAN and the second RAN. The femtAP may instruct or configure the UE to change the UE state from low-power connected state into an idle mode and initiate a teardown of network bearers based on at least one of inactivity in the second RAN or inactivity over the network bearer. According to certain aspects, the femtAP may maintain network bearers after the UE is placed in an idle mode on the first RAN. For example, the femtAP may suppress a message to the core network indicating the UE has entered the idle mode on the first RAN. The femtAP may provide an indication to the UE that the network bearers are maintained via a message instructing the UE to enter the idle mode in the first RAN.

According to certain aspects, the femtAP may receive a NAS message from the core network. If this happens in the case where the femtAP maintains the network bearers after the UE is placed in an idle mode on the first RAN, the femtAP may be unable to deliver the NAS message to the UE over the first RAN. The femtAP may then deliver the NAS message to the UE over the second RAN. Alternatively, the femtAP may initiate a page to the UE over the first RAN and may deliver the NAS message to the UE only after receiving a response to the page. In another alternative, the femtAP may request, via the second RAN, that the UE bring up a connection (e.g., RRC connection) in the first RAN and may deliver the NAS message to the UE only after the UE has initiated the connection. In yet another alternative, the femtAP may transmit, to the core network, a message indicating a failure to deliver the NAS message to the UE and may deliver the NAS message to the UE only after the UE has initiated a connection in the first RAN.

According to certain aspects, the femtAP may initiate a teardown of the network bearers based on at least one of inactivity in the second RAN or inactivity over the network bearer. Additionally, the femtAP may deactivate the connection in the second RAN. The femtAP may also provide an indication of the teardown to the UE.

According to certain aspects, the femtAP may configure the UE to disable reselection in the first RAN while communicating with the core network via the second RAN. Alternatively, the femtAP may determine the UE has performed reselection in the first RAN and may disable a connection of the UE in the second RAN, in response to the determination. The femtAP may send to the UE, via the second RAN, commands for performing handover in the first RAN.

According to certain aspects, the femtAP may receive a request from the UE to enter a low power state for the first RAN and may determine how to handle the request based, at least in part, on activity in the second RAN. For example, the femtAP may send the UE to a low-power connected state if there is inactivity in the first RAN and there is activity in the second RAN. Alternatively, the femtAP may send the UE to idle mode if there is inactivity on the one or more network bearers or inactivity in both the first RAN and the second RAN. According to certain aspects, the femtAP may reject the request from the UE if there is activity in the second RAN.

The above techniques for entry into dormancy modes are a few examples of addressing the power management associated with using Wi-Fi as an additional carrier. For example, in certain cases, the network 830 or the UE 810 may not support low-power connected mode. According to certain aspects, alternative techniques may be used to achieve the same or similar behavior in each case (e.g., to save power and avoid tearing down the network bearer 916 while traffic is still flowing).

Example Modified Dormancy Management when Wi-Fi Carrier is Activated and Low-Power Connected Mode Not Supported According to certain aspects, if the network 830 and the UE 810 support only the idle mode, a coupling may exist between sending the UE 810 to a low-power state and bringing down the network bearer 916. In other words, sending the UE 810 to a low-power state may be accompanied with bringing down the network bearer 916. According to certain aspects, the dormancy mechanism may performed in one or more steps in order to remove the coupling between sending the UE 810 to a low-power state and bringing down the network bearer 916.

According to certain aspects, sending the UE 810 to idle mode may be triggered by inactivity on the cellular radio link 912, however, network bearer 916 teardown may be based on inactivity on the network bearer 916. According to certain aspects, the term "radio network equipment" as used herein, may be used to refer generally to entities such as node B, eNB, or radio network controller (RNC).

Figure 12:
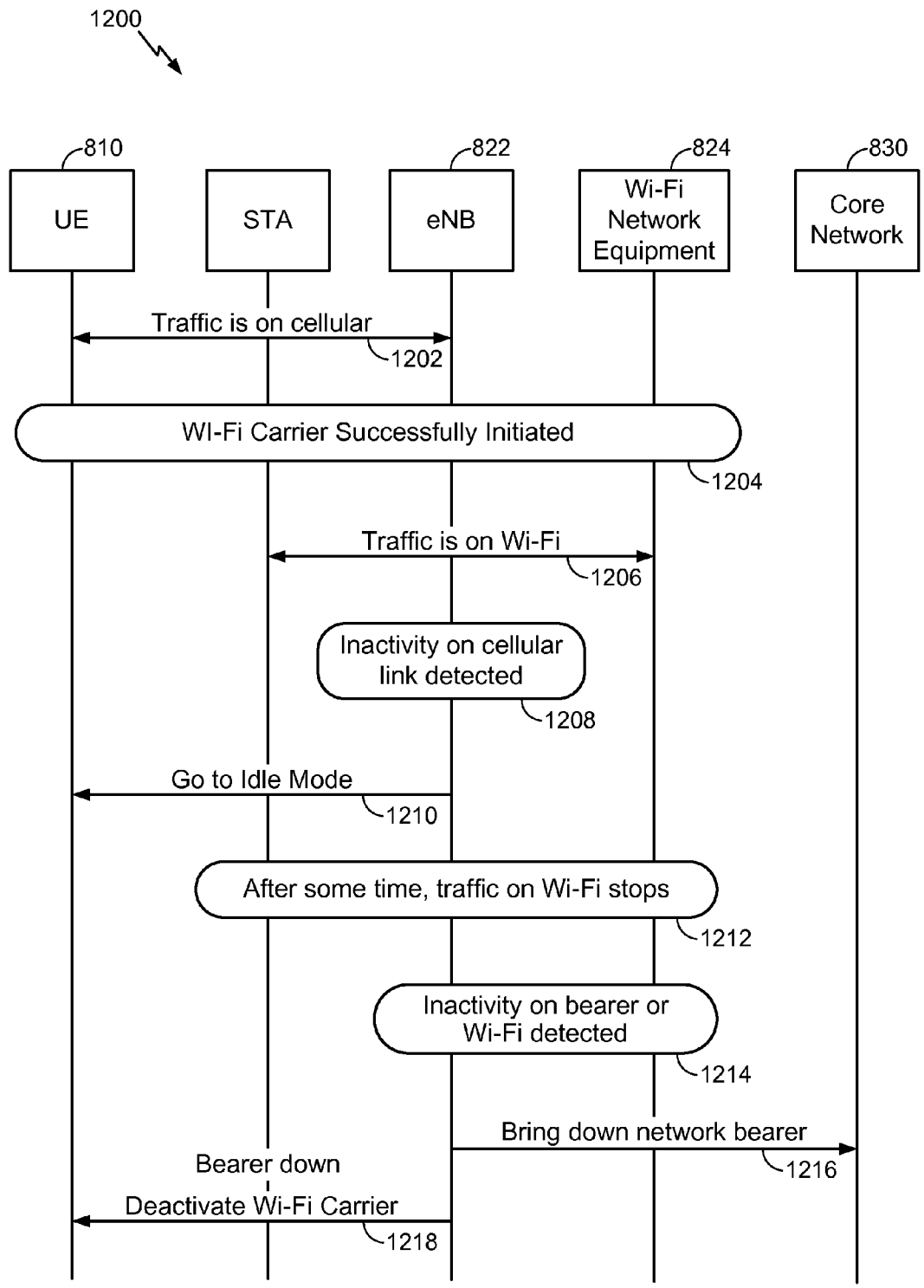
FIG. 12 illustrates an example call flow for modified power management entry in a wireless communication system, in accordance with certain aspects of the present disclosure.

FIG. 12 illustrates an example call flow 1200 for modified power management entry of UE 810 in a wireless communication system (e.g., the wireless communication system 800 illustrated in FIG. 8) with an additional Wi-Fi carrier, according to aspects of the present disclosure. As shown in FIG. 12, at 1202, traffic between the UE 810 and femtAP 820 may be over the cellular radio link (e.g., link Uu or link 912 illustrated in FIGS. 8 and 9, respectively) (e.g., the first RAN). At 1204, the Wi-Fi carrier (e.g., Wi-Fi link or link 914 illustrated in FIGS. 8 and 9, respectively) between the UE 810 and femtAP 820 may be successfully initiated. Subsequently, at 1206, traffic flow may switch to the Wi-Fi carrier (e.g., the second RAN).

According to aspects of the present disclosure provided herein, upon successful Wi-Fi carrier initiation for the UE 810, the following various modifications may be provided until the Wi-Fi carrier is deactivated.

According to an example implementation, the trigger to send the UE 810 to idle mode may be based on inactivity over the cellular link 912 (e.g., the first RAN) and not inactivity over the network bearer 916. Thus, as shown at 1208, inactivity on the cellular radio link 912 may be detected (i.e., traffic on the first RAN stops). Subsequently, at 1210, the femtAP 820 may send the UE 810 to idle mode.

According to another example implementation, aspects of the present disclosure may provide for determining (modifying) the behavior at the network equipment (e.g., femtAP 820). For example, the network equipment may be configured such that when the UE 810 is sent to idle mode, for example at 1210, based on inactivity over the cellular link 912 (e.g., the first RAN), the network bearer 916 teardown does not occur. According to an implementation, the femtAP 820 may not initiate the teardown of the network bearer 916 when the UE 810 is sent to idle mode. The femtAP 820 may suppress the message to the core network 830 that the UE 810 has entered the idle mode, thereby preventing the core network 830 from initiating the teardown of the network bearer 916. In other words, the UE 810 may still appear to be in a connected state from the core network's perspective. According to certain aspects, in addition to suppressing the message to the core network 830, the femtAP 820 may modify its message to the UE 810 to initiate idle mode by including an indication that the network bearer 916 is still up.

According to yet another example implementation, a trigger may be added to tear down the network bearer 916 after UE 810 has been sent to idle mode at 1210. For example, the network bearer 916 teardown may be triggered when Wi-Fi carrier gets deactivated. Additionally or alternatively, the network bearer 916 teardown may be triggered when based on traffic inactivity over the network bearer 916. Accordingly, as shown at 1212, after some time, traffic on the Wi-Fi 914 may stop. After inactivity on the Wi-Fi carrier 914 or inactivity on the network bearer 916 is detected at 1214, the network bearer 916 may be brought down at 1216.

For example, although not shown in FIG. 12, at 1216, the femtAP 820 may send a message to the core network 830 that the UE 810 has entered idle mode and the femtAP may initiate the teardown of the network bearer 916. Alternatively, also not shown in FIG. 12, at 1216, the core network 830 may initiate the teardown of the network bearer 916 based on the message. According to certain aspects, in addition to sending a message to the core network 830 at 1216, upon deciding to teardown the network bearer 916, the femtAP 820 may, at 1218, may send an indication to the UE 810 over the first RAN (e.g., cellular radio link 912) or second RAN (e.g., Wi-Fi carrier 914) that its network bearer 916 is being torn down. According to certain aspects, at 1218, the femtAP 820 may also deactivate the UE's Wi-Fi carrier (e.g., the second RAN) before or after the bearer teardown.

According to aspects, if the core network 830 sends the UE 810 to idle mode and tears down network bearer 916, the UE 810 may deactivate the Wi-Fi carrier, since the path to the core network 830 may be unavailable. In some cases, however, if the network 830 sends the UE to idle mode but does not teardown the network bearer 916, the UE 810 may not deactivate the Wi-Fi carrier, since the network bearer 916 is kept up. Accordingly, aspects of the present disclosure may provide for determining an idle mode initiation procedure at the UE 810. For example, if the message from the femtAP 820 requesting the UE 810 to initiate idle mode does not include an indication that the network bearer 916 is still up, then the UE 810 may deactivate the Wi-Fi carrier. On the other hand, if the message from the femtAP 820 requesting the UE 810 to initiate idle mode does include an indication that the network bearer 916 is still up, then the UE 810 may not deactivate the Wi-Fi carrier. However, if the UE 810 receives a message (e.g., not sent with the idle mode command) from the femtAP 820 that the network bearer 916 is being torn down, the UE 810 may deactivate the Wi-Fi carrier.

As described above, according to aspects of the present disclosure, the UE 810 may be sent to idle mode and the femtAP 820 may suppress this information from the core network 830. According to aspects of the disclosure provided herein, because the core network 830 may not know the UE 810 has entered the idle mode, the core network 830 may then send a NAS message to the UE 810 without first paging the UE 810. Various techniques are provided herein for handling the processing, at the femtAP 820, of NAS messages sent by the core network 830 to the UE 810 when the 810 is in idle mode but the information has been suppressed from the core network 830.

According to an example implementation, when the core network 830 sends a NAS message to the UE 810, the femtAP 820 may receive the NAS message from the core network 830 and may initiate a page to the UE 810 over the first RAN (e.g., the cellular link 912). The femtAP 820 may then deliver the NAS message to the UE 810 after receiving a response to the page from the UE 810. According to certain aspects, since the femtAP 820 may not know the paging parameters (e.g., the paging hash), paging parameters may be included in the UE context delivered to the femtAP 820 from MME 832 at the time of connection setup.

According to another example implementation, when the core network 830 sends a NAS message to the UE 810, the femtAP 820 may receive the NAS message from the core network 830 and may request via the second RAN (e.g., Wi-Fi link 914) that the UE 810 bring up a RRC connection over the first RAN (e.g., cellular link 912). The femtAP 820 may then deliver the NAS message via the first RAN to the UE 810 after the UE 810 has initiated the RRC connection.

According to yet another example implementation, when the core network 830 sends a NAS message to the UE 810, the femtAP 820 may receive the NAS message from the core network 830 and may transmit, to the core network 830, a message indicating a failure to deliver the NAS message to the UE 810. The core network 830 may then page the UE 810. Then, after the UE 810 has initiated a RRC connection in the first RAN in response to the page, the femtAP 820 may deliver the NAS message to the UE 810.

According to certain aspects, the NAS message may simply be delivered to the UE over the second RAN.

Figure 13:
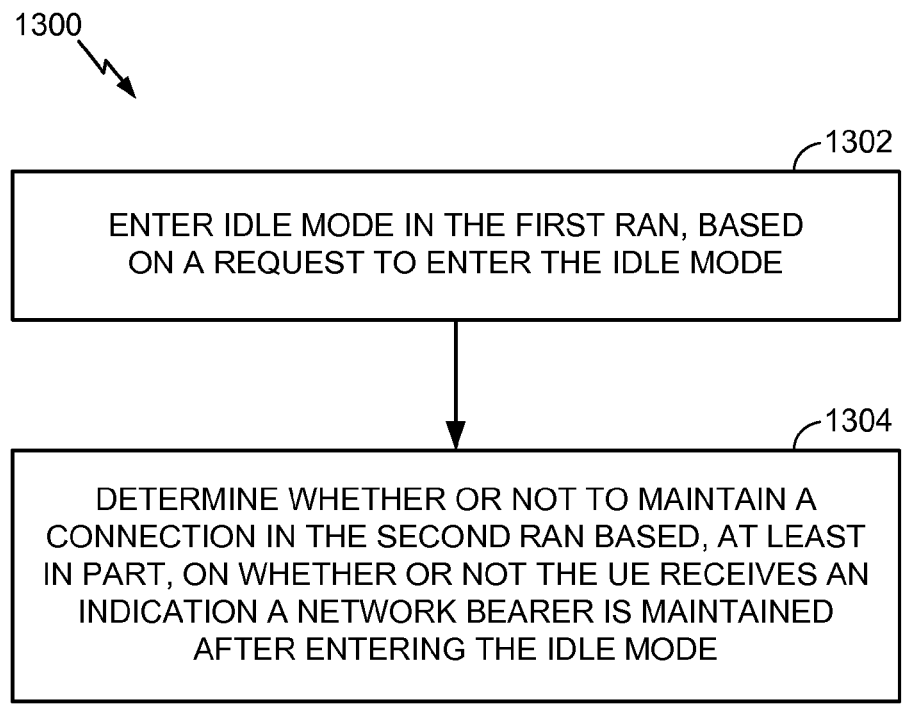
FIG. 13 illustrates example operations for wireless communications by a UE, in accordance with certain aspects of the present disclosure.
Figure 13A:
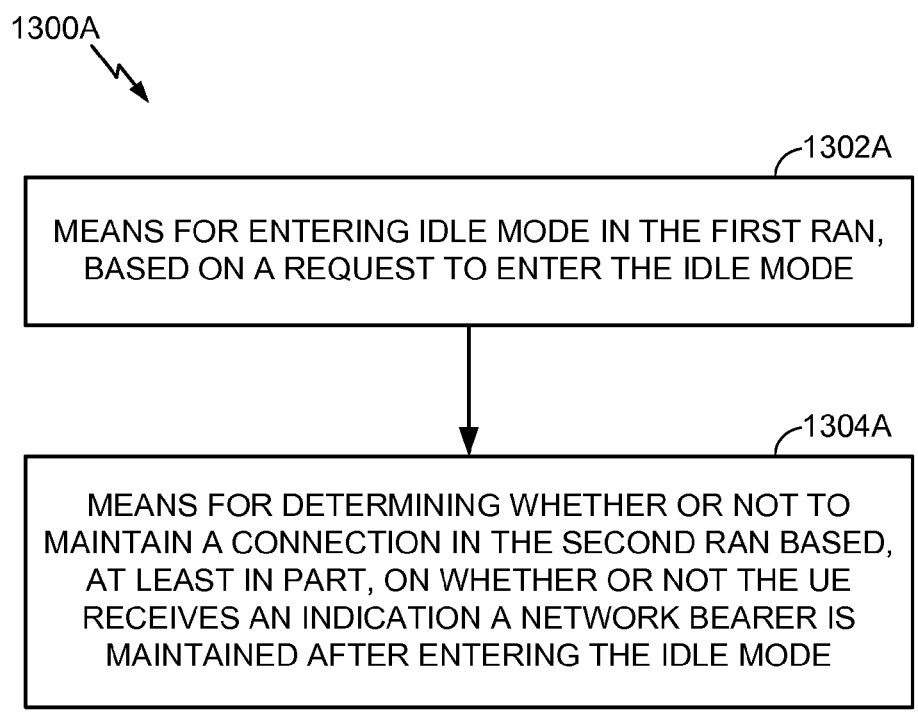
FIG. 13A illustrates example means capable of performing the operations shown in FIG. 13, in accordance with certain aspects of the present disclosure.

FIG. 13 illustrates example operations 1300 for wireless communications, in accordance with certain aspects of the present disclosure. The operations 1300 may be performed, for example, by a UE (e.g., UE 810) capable of communicating with a core network (e.g., core network 830) via at least a first RAN (e.g., WWAN) and a second RAN (e.g., WLAN).

The operations 1300 may begin, at 1302, by entering idle mode in the first RAN, based on a request to enter the idle mode.

At 1304, the UE may determine whether or not to maintain a connection in the second RAN based, at least in part, on whether or not the UE receives an indication a network bearer is maintained after entering idle mode. For example, the UE may deactivate the connection in the second RAN if the UE does not receive an indication the network bearer is maintained after entering idle mode.

According to certain aspects, the UE may control (or be controlled) when to place the UE in a low power state in the first or second RAN, based, at least in part, on traffic routing switching between the first RAN and the second RAN. According to certain aspects, the UE may modify (or be configured by the base station to modify) a value of an inactivity timeout for a trigger to change the UE state from low power connected state to an idle mode. Alternatively, the base station may disable the trigger to change the UE state from low power connected state to an idle mode.

Example Modified Cell-Reselection

In general, the mobility of a UE (e.g., such as UE 810) in idle mode may be managed by the reselection procedure. In a reselection procedure, the UE 810 may measure its neighboring cells and apply rules pre-configured by the network to determine which cell to camp on. The UE 810 may not immediately inform the network upon reselecting to a new cell. Mobility of a UE 810 that is in connected mode may be controlled by the network, for example, by means of handover commands signaled to the UE 810. However, in some low-power connected states such as Cell paging channel (PCH) and Universal Mobile Telecommunications System (UMTS) Terrestrial Radio Access Network (UTRAN) registration area paging channel (URA_PCH), the UE 810 may determine whether to reselect to a different cell using measurements and rules pre-configured by the network, similar to an idle mode reselection procedure. One difference from the idle mode behavior may be that the UE 810 in a lower-power connected state may inform the network upon reselecting to a new cell by means of a cell update procedure. For URA_PCH, the UE 810 may inform the network only if the URA changes due to the reselection.

In some cases, according to techniques described above for modified power management where an additional Wi-Fi carrier is used, UE 810 may be in an idle state, but the network bearer 916 may remain up with a first network equipment (e.g., a first femtAP 820). If the UE 810 performs reselection to a second network equipment (e.g., a second femtAP), there may confusion when the UE 810 attempts to establish an RRC connection with the second network equipment because, from the core network's 830 perspective, the UE 810 may still be connected to the first network equipment. Similarly, if the UE 810 is in a low-power connected state (e.g., Cell_PCH or URA_PCH) and the UE 810 may use reselection procedures to determine the cell on which to camp. However, a change in the cell may trigger a cell update procedure to inform the network 830 of the change. This scenario may also create confusion at the core network 830 because the UE 810 may still be connected to the first cell and exchanging traffic (e.g., over Wi-Fi). As explained above, in URA_PCH, only a change in URA may trigger a cell update.

According to aspects of the present disclosure, various techniques are provided for reselection behavior at the UE 810 upon successful Wi-Fi carrier initiation until the Wi-Fi carrier is deactivated. According to an example implementation, the UE 810 may—or the femtAP 820 may configure the UE 810 to—disable reselection in the first RAN (e.g., LTE) while communicating with the core network 830 via the second RAN (e.g., WLAN). For example, the femtAP 820 may configure the UE 810 to disable reselection until the Wi-Fi carrier is deactivated. This may avoid the confusion at the core network 830.

According to another example implementation, the UE 810 may disable a connection in the second RAN, or, the femtAP 820 may determine that the UE 810 has performed reselection in the first RAN and may disable a connection of the UE 810 in the second RAN, in response to the determination. This implementation may be applicable, for example, to the Cell_PCH or URA_PCH case when the cell update informs the network of a reselection.

According to yet another example implementation, the femtAP 820 may send to the UE 810, via the second RAN, commands for performing a handover in the first RAN. For example, the femtAP 820 may transmit handover commands to the UE 810 over the Wi-Fi carrier, and the UE 810 may perform reselection only according to these commands rather than according to the default reselection procedure.

Figure 14:
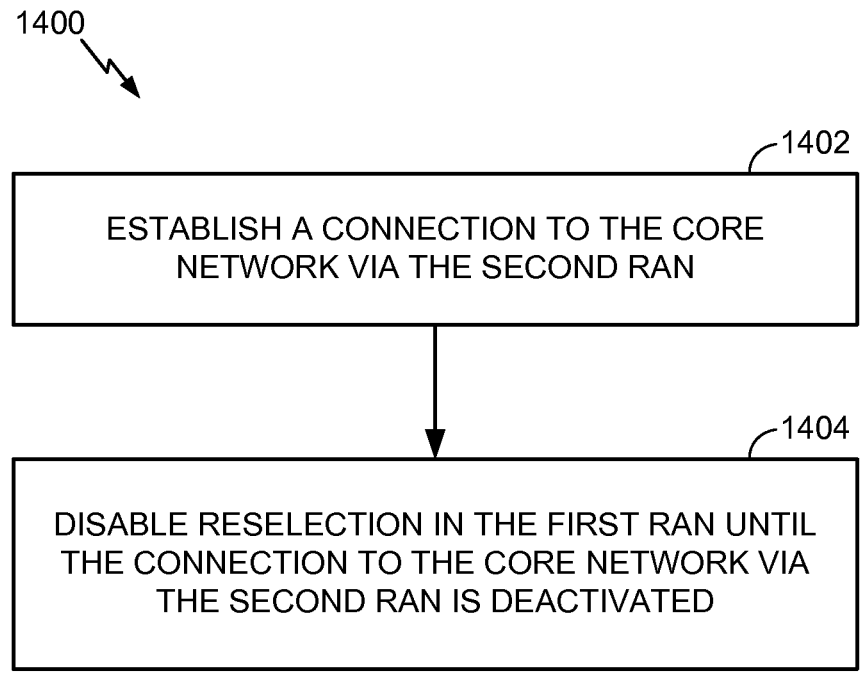
FIG. 14 illustrates example operations for wireless communications by a UE, in accordance with certain aspects of the present disclosure.
Figure 14A:
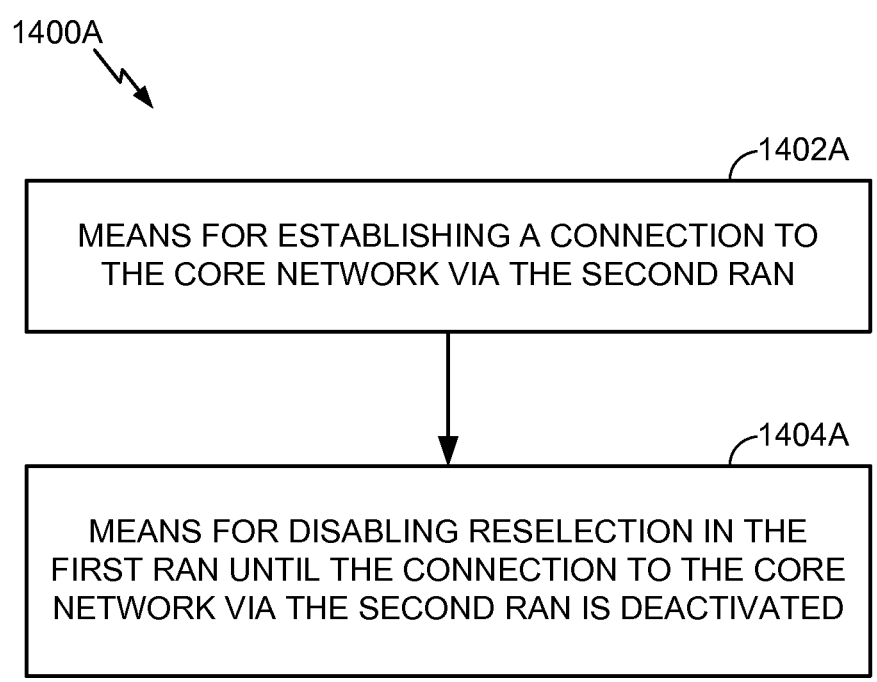
FIG. 14A illustrates example means capable of performing the operations shown in FIG. 14, in accordance with certain aspects of the present disclosure.

FIG. 14 illustrates example operations 1400 for wireless communications, in accordance with certain aspects of the present disclosure. The operations 1400 may be performed, for example, by a UE (e.g., UE 810) capable of communicating with a core network via at least a first RAN (e.g., WWAN) and a second RAN (e.g., WLAN).

The operations 1400 may begin, at 1402, by establishing a connection to the core network via the second RAN.

At 1404, the UE may disable reselection in the first RAN until the connection to the core network via the second RAN is deactivated.

Figure 15:
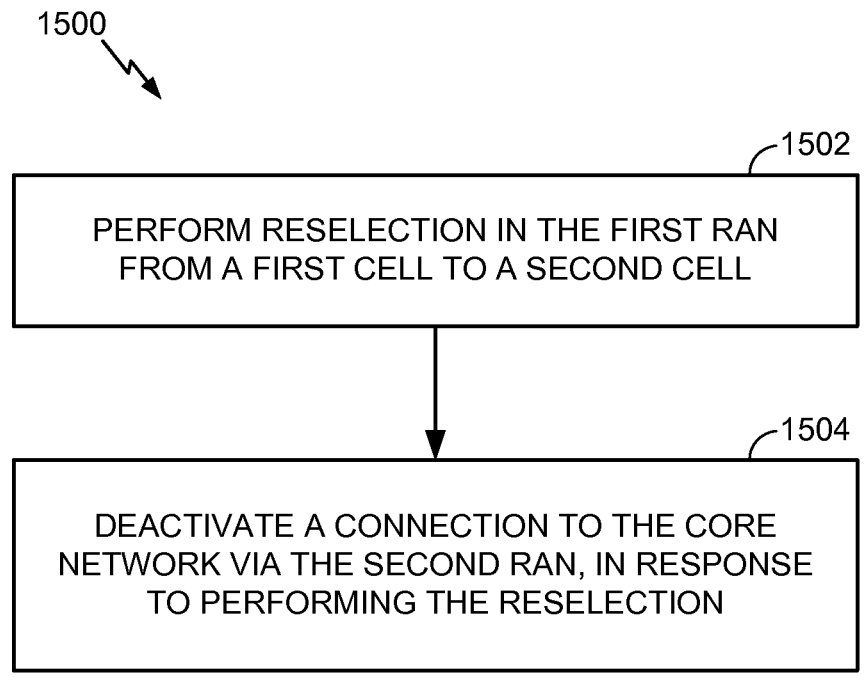
FIG. 15 illustrates example operations for wireless communications by a UE, in accordance with certain aspects of the present disclosure.
Figure 15A:
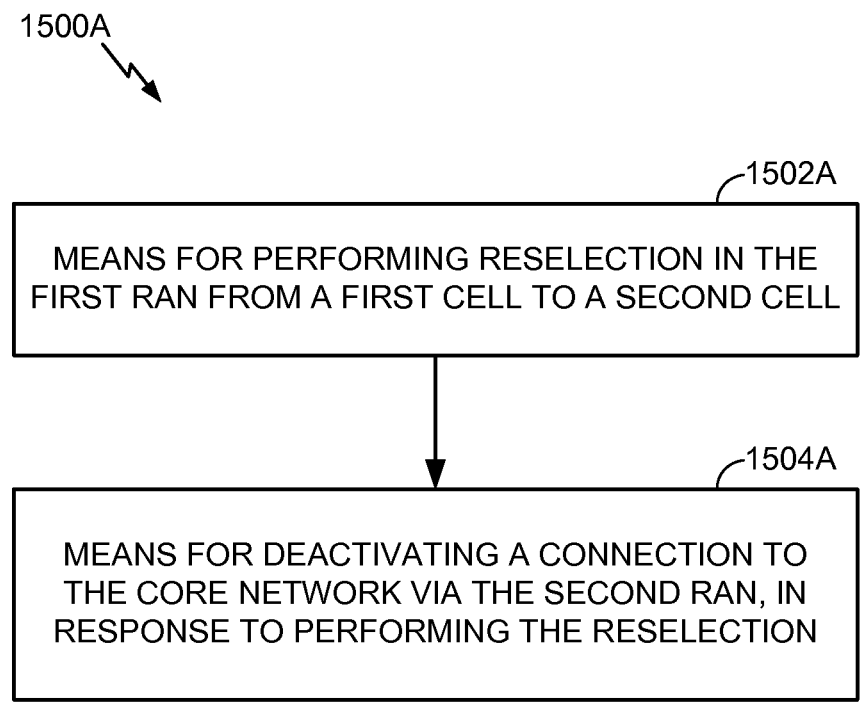
FIG. 15A illustrates example means capable of performing the operations shown in FIG. 15, in accordance with certain aspects of the present disclosure.

FIG. 15 illustrates example operations 1500 for wireless communications, in accordance with certain aspects of the present disclosure. The operations 1500 may be performed, for example, by a UE (e.g., UE 810) capable of communicating with a core network via at least a first RAN (e.g., WWAN) and a second RAN (e.g., WLAN).

The operations 1500 may begin, at 1502, by performing reselection in the first RAN from a first cell to a second cell.

At 1504, the UE may deactivate a connection to the core network via the second RAN, in response to performing the reselection. According to certain aspects, along with the femtAP triggering network bearer teardown for UEs when their second RAN connection gets deactivated, this may ensure that the network bearer is torn down when the UE reselects to a different femtAP.

Figure 16:
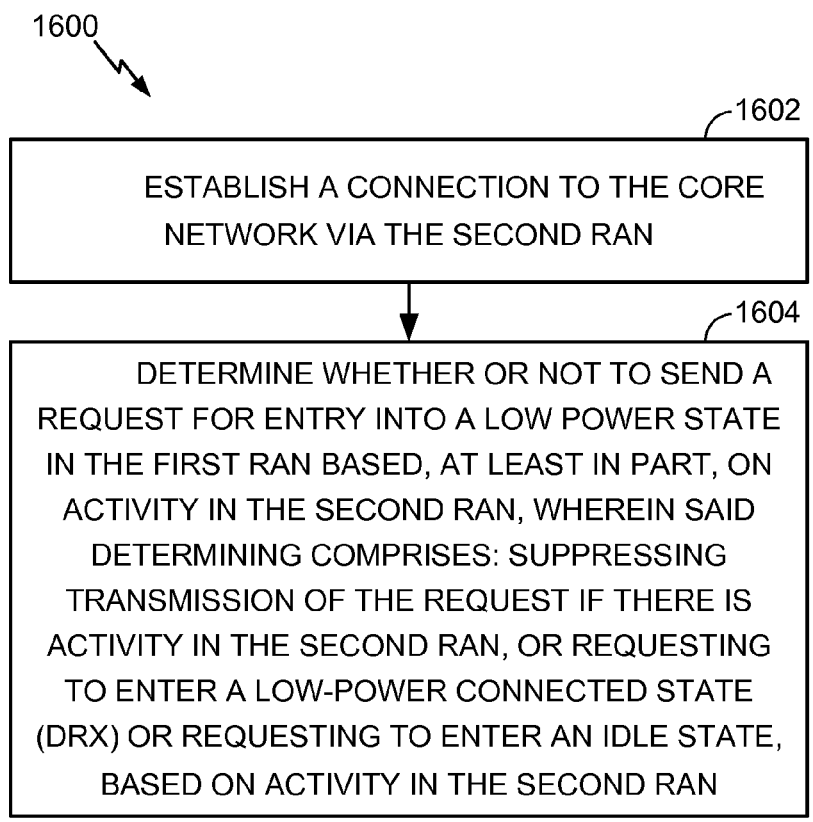
FIG. 16 illustrates example operations for wireless communications by a UE, in accordance with certain aspects of the present disclosure.
Figure 16A:
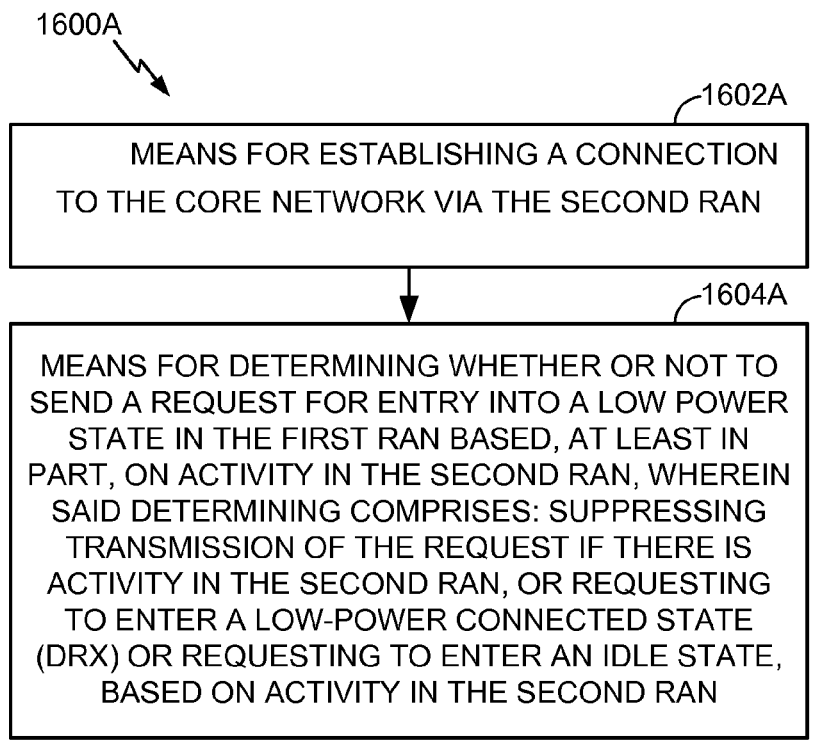
FIG. 16A illustrates example means capable of performing the operations shown in FIG. 16, in accordance with certain aspects of the present disclosure.

FIG. 16 illustrates example operations 1600 for wireless communications, in accordance with certain aspects of the present disclosure. The operations 1600 may be performed, for example, by a UE (e.g., UE 810) capable of communicating with a core network via at least a first RAN (e.g., WWAN) and a second RAN (e.g., WLAN).

The operations 1600 may begin, at 1602, by establishing a connection to the core network via the second RAN. At 1604, the UE may determine whether or not to send a request for entry into a low power state in the first RAN based, at least in part, on activity in the second RAN. For example, the UE may determine to suppress transmission of the request if there is activity in the second RAN or request to enter a low-power connected state (DRX) or request to enter an idle state, based on activity in the second RAN.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 1000, 1100, and 1300-1500 illustrated in FIGS. 10, 11, and 13-16, respectively, correspond to means 1000A, 1100A and 1300A-1600A illustrated in FIGS. 10A, 11A, and 13A-16A, respectively.

For example, means for transmitting may comprise a transmitter and/or an antenna(s) 224 of the UE 210 or a transmitter and/or an antenna(s) 252 of the base station 250. Means for receiving may comprise a receiver and/or an antenna(s) 224 of the UE 210 or a receiver and/or an antenna(s) 252 of the base station 250. Means for determining may comprise a processing system, which may include one or more processors, of the UE 210 or one or more processors of the base station 250.

According to certain aspects, such means may be implemented by processing systems configured to perform the corresponding functions by implementing various algorithms (e.g., in hardware or by executing software instructions). For example, an algorithm for controlling when the UE is placed in a low power state for the first RAN based, at least in part, on inactivity of the UE in the first RAN and an algorithm for controlling when to modify one or more network bearers between the first RAN or the second RAN and the core network based, at least in part, on at least one of inactivity on the one or more network bearers or inactivity in both the first RAN and the second RAN. In another example, an algorithm for disabling reselection in the first RAN until the connection to the core network via the second RAN is deactivated. In yet another example, an algorithm for performing reselection in the first RAN from a first cell to a second cell and an algorithm for deactivating a connection to the core network via the second RAN, in response to performing the reselection. In yet another example, an algorithm for establishing a connection to the core network via the second RAN and an algorithm for determining whether or not to send a request to the core network for entry into a low power state in the first RAN based at least on activity in the second RAN. In yet another example, an algorithm for entering idle mode in the first RAN, based on a request to enter the idle mode, and an algorithm for determining whether or not to maintain a connection in the second RAN based, at least in part, on whether or not the UE receives an indication a network bearer is maintained after entering idle mode. In yet another example, an algorithm establishing a connection to the core network via the second RAN and an algorithm for determining whether or not to send a request for entry into a low power state in the first RAN based, at least in part, on activity in the second RAN, wherein said determining comprises: suppressing transmission of the request if there is activity in the second RAN or requesting to enter a low-power connected state (DRX), or requesting to enter an idle state, based on activity in the second RAN.

The various algorithms may implemented by a computer-readable medium that may be a non-transitory computer-readable medium. The computer-readable medium may have computer executable instructions (e.g., code) stored thereon. For example, the instructions may be executed by a processor or processing system of the UE 210 or base station 250 and stored in a memory 232 of the UE 210 or memory 272 of the base station 250. For example, the computer-readable medium may have computer executable instructions stored thereon for controlling when the UE is placed in a low power state for the first RAN based, at least in part, on inactivity of the UE in the first RAN and instructions for controlling when to modify one or more network bearers between the first RAN or the second RAN and the core network based, at least in part, on at least one of inactivity on the one or more network bearers or inactivity in both the first RAN and the second RAN. In another example, the computer-readable medium may have computer executable instructions stored thereon for disabling reselection in the first RAN until the connection to the core network via the second RAN is deactivated. In another example, the computer-readable medium may have computer executable instructions stored thereon for performing reselection in the first RAN from a first cell to a second cell and instructions for deactivating a connection to the core network via the second RAN, in response to performing the reselection. In yet another example, the computer-readable medium may have computer executable instructions stored thereon for establishing a connection to the core network via the second RAN and instructions for determining whether or not to send a request to the core network for entry into a low power state in the first RAN based at least on activity in the second RAN. In yet another example, the computer-readable medium may have computer executable instructions stored thereon for entering idle mode in the first RAN, based on a request to enter the idle mode, and instructions for determining whether or not to maintain a connection in the second RAN based, at least in part, on whether or not the UE receives an indication a network bearer is maintained after entering idle mode. In yet another example, the computer-readable medium may have computer executable instructions stored thereon for establishing a connection to the core network via the second RAN and instructions for determining whether or not to send a request for entry into a low power state in the first RAN based, at least in part, on activity in the second RAN, wherein said determining comprises: suppressing transmission of the request if there is activity in the second RAN or requesting to enter a low-power connected state (DRX), or requesting to enter an idle state, based on activity in the second RAN.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM or any other form of storage medium known in the art. An exemplary storage medium is coupled to the processor such that the processor can read information from, and/or write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal Generally, where there are operations illustrated in Figures, those operations may have corresponding counterpart means-plus-function components with similar numbering.

In one or more exemplary designs, the functions described may be implemented in hardware, software, firmware or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. An apparatus for wireless communications with a user equipment (UE) capable of communicating with a core network via at least a first radio access network (RAN) and a second RAN, comprising:
   at least one processor configured to:
      control when the UE is placed in a low power state in the first RAN based, at least in part, on inactivity of the UE in the first RAN; and
      control when to modify one or more network bearers between the first RAN or the second RAN and the core network based, at least in part, on at least one of inactivity on the one or more network bearers or inactivity in both the first RAN and the second RAN; and
   a memory coupled with the at least one processor.

2. The apparatus of claim 1, wherein:
   the first RAN comprises a wide area wireless access network (WWAN); and
   the second RAN comprises a wireless local area network (WLAN).

3. The apparatus of claim 1, wherein controlling when the UE is placed in the low power state in the first RAN based, at least in part, on inactivity of the UE in the first RAN comprises:
   placing the UE in a low power connected state based on inactivity in the first RAN.

4. The apparatus of claim 3, wherein the low power connected state comprises a discontinuous reception (DRX) state.

5. The apparatus of claim 3, wherein the at least one processor is further configured to:
   send the UE from the low power connected state to an idle mode and initiating a teardown of the one or more network bearers based on at least one of inactivity in the second RAN or inactivity over the one or more network bearers.

6. The apparatus of claim 1, wherein controlling when to place the UE in the low power state in the first RAN comprises:
   modifying a value of an inactivity timeout trigger, in response to activity in the second RAN.

7. The apparatus of claim 1, wherein controlling when the UE is placed in the low power state in the first RAN based, at least in part, on inactivity of the UE in the first RAN comprises:
   determining when to place the UE in an idle mode based on inactivity of the UE in the first RAN.

8. The apparatus of claim 7, wherein controlling when to modify the one or more network bearers between the first RAN or the second RAN and the core network based, at least in part, on inactivity on the one or more network bearers comprises:
   maintaining the one or more network bearers after the UE is placed in the idle mode in the first RAN.

9. The apparatus of claim 8, wherein maintaining the one or more network bearers after the UE is placed in the idle mode in the first RAN comprises:
   suppressing a message to the core network indicating the UE has entered the idle mode in the first RAN, wherein the one or more network bearers are maintained.

10. The apparatus of claim 9, wherein the at least one processor is further configured to:
    receive a network access stratum (NAS) message from the core network; and
    deliver the NAS message to the UE over the second RAN.

11. The apparatus of claim 9, wherein the at least one processor is further configured to:
    receive a network access stratum (NAS) message from the core network;
    initiate a page to the UE over the first RAN; and
    deliver the NAS message to the UE after receiving a response to the page.

12. The apparatus of claim 9, wherein the at least one processor is further configured to:
    receive a network access stratum (NAS) message from the core network;
    request, via the second RAN, that the UE initiate a connection in the first RAN; and
    deliver the NAS message to the UE after the UE has initiated the connection.

13. The apparatus of claim 9, wherein the at least one processor is further configured to:
    receive a network access stratum (NAS) message from the core network;
    transmit, to the core network, a message indicating a failure to deliver the NAS message to the UE; and
    deliver the NAS message to the UE after the UE has initiated a connection in the first RAN.

14. The apparatus of claim 8, wherein the at least one processor is further configured to:
    provide an indication to the UE that the one or more network bearers are maintained via a message instructing the UE to enter the idle mode in the first RAN.

15. The apparatus of claim 8, wherein the at least one processor is further configured to:
    initiate a teardown of the one or more network bearers based on at least one of inactivity in the second RAN or inactivity over the one or more network bearers.

16. The apparatus of claim 15, wherein the at least one processor is further configured to:
    deactivate a connection in the second RAN.

17. The apparatus of claim 15, wherein the at least one processor is further configured to:
    provide an indication of the teardown to the UE.

18. The apparatus of claim 1, wherein the at least one processor is further configured to:

configure the UE to disable reselection in the first RAN while communicating with the core network via the second RAN.

19. The apparatus of claim 1, wherein the at least one processor is further configured to:
    determine the UE has performed reselection in the first RAN; and
    disable a connection of the UE in the second RAN, in response to the determination.

20. The apparatus of claim 1, wherein the at least one processor is further configured to:
    send to the UE, via the second RAN, at least one command to perform handover in the first RAN.

21. The apparatus of claim 1, wherein the at least one processor is further configured to:
    receive a request from the UE to enter the low power state in the first RAN; and
    process the request based, at least in part, on activity in the second RAN.

22. The apparatus of claim 21, wherein the processing comprises:
    sending the UE to a low power connected state if there is inactivity in the first RAN and there is activity in the second RAN.

23. The apparatus of claim 21, wherein the processing comprises:
    sending the UE to an idle mode if there is inactivity on the one or more network bearers or inactivity in both the first RAN and the second RAN.

24. The apparatus of claim 21, wherein the processing comprises:
    rejecting the request from the UE if there is activity in the second RAN.

25. A method for wireless communications with a user equipment (UE) capable of communicating with a core network via at least a first radio access network (RAN) and a second RAN, comprising:
    controlling when the UE is placed in a low power state in the first RAN based, at least in part, on inactivity of the UE in the first RAN; and
    controlling when to modify one or more network bearers between the first RAN or the second RAN and the core network based, at least in part, on at least one of inactivity on the one or more network bearers or inactivity in both the first RAN and the second RAN.

26. The method of claim 25, wherein:
    the first RAN comprises a wide area wireless access network (WWAN); and
    the second RAN comprises a wireless local area network (WLAN).

27. The method of claim 25, wherein controlling when the UE is placed in the low power state in the first RAN based, at least in part, on inactivity of the UE in the first RAN comprises:
    placing the UE in a low power connected state based on inactivity in the first RAN.

28. The method of claim 27, wherein the low power connected state comprises a discontinuous reception (DRX) state.

29. A method for wireless communications by a user equipment (UE) capable of communicating with a core network via at least a first radio access network (RAN) and a second RAN, comprising:
    establishing a connection to the core network via the second RAN; and
    determining whether or not to send a request for entry into a low power state in the first RAN based, at least in part, on activity in the second RAN, wherein said determining comprises:
        suppressing transmission of the request if there is activity in the second RAN, or
        requesting to enter a low-power connected state or requesting to enter an idle state, based on activity in the second RAN.

30. An apparatus for wireless communications by a user equipment (UE) capable of communicating with a core network via at least a first radio access network (RAN) and a second RAN, comprising:
    at least one processor configured to:
        establish a connection to the core network via the second RAN; and
        determine whether or not to send a request for entry into a low power state in the first RAN based, at least in part, on activity in the second RAN, wherein said determining comprises:
            suppressing transmission of the request if there is activity in the second RAN, or
            requesting to enter a low-power connected state or requesting to enter an idle state, based on activity in the second RAN.

* * * * *